(12) United States Patent
Magi

(10) Patent No.: US 10,061,350 B2
(45) Date of Patent: Aug. 28, 2018

(54) WEARABLE ELECTRONIC DEVICE INCLUDING A SHAPE MEMORY MATERIAL FOR OPENING, CLOSING OR ADJUSTING STRAP PORTIONS OF THE WEARABLE ELECTRONIC DEVICE

(71) Applicant: Intel Corporation, Santa Clara, CA (US)

(72) Inventor: Aleksander Magi, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 996 days.

(21) Appl. No.: 14/142,611

(22) Filed: Dec. 27, 2013

(65) Prior Publication Data

US 2015/0185764 A1   Jul. 2, 2015

(51) Int. Cl.
*A41D 13/08* (2006.01)
*G06F 1/16* (2006.01)

(52) U.S. Cl.
CPC ............. *G06F 1/163* (2013.01); *A41D 13/08* (2013.01); *G06F 1/1652* (2013.01)

(58) Field of Classification Search
CPC ....... A41D 13/08; A41D 19/0044; A41F 3/00; A44C 5/0069; A45F 5/00
USPC ............... 2/16, 162, 310, 910; 224/175, 221
See application file for complete search history.

(56) References Cited

U.S. PATENT DOCUMENTS

| 265,044 A | 9/1882 | Engelmann |
|---|---|---|
| D30,922 S | 5/1899 | Dietsch |
| D30,923 S | 5/1899 | Dietsch |
| D36,745 S | 1/1904 | Hunt |
| D92,045 S | 4/1934 | Stein |
| 2,743,857 A | 5/1956 | Gold et al. |
| D247,101 S | 1/1978 | Durante |
| D255,022 S | 5/1980 | Hofman |
| D548,113 S | 8/2007 | Burton |
| D562,173 S | 2/2008 | Hardy |
| D616,790 S | 6/2010 | Mear |
| D625,928 S | 10/2010 | Lee et al. |
| D644,201 S | 8/2011 | Park et al. |

(Continued)

OTHER PUBLICATIONS

Liu, C., et al., "Review of progress in shape-memory polymers," Journal of Materials Chemistry, 2007, vol. 17, pp. 1543-1558, 16 pages.

(Continued)

*Primary Examiner* — Tejash Patel
(74) *Attorney, Agent, or Firm* — Patent Capital Group

(57) ABSTRACT

Particular embodiments described herein provide for a wearable electronic device, such as a bracelet, watch, wristband or armband that includes a circuit board coupled to a plurality of electronic components (which may include any type of components, elements, circuitry, etc.). One particular implementation of a wearable electronic device may include one or more strap portions that may each comprise a shape memory material, which has a default shape. At least one strap portion may further comprise one or more input elements configured to register one or more inputs and logic configured to receive input data based the one or more inputs and to manipulate, based, at least in part, on the input data, the shape memory material for each of the one or more strap portions from a deformed shape back to its default shape.

15 Claims, 26 Drawing Sheets

(56) References Cited

U.S. PATENT DOCUMENTS

| | | | |
|---|---|---|---|
| 8,380,327 B2* | 2/2013 | Park | G05B 11/01 |
| | | | 29/592.1 |
| D704,938 S | 5/2014 | Mischel et al. | |
| D705,777 S | 5/2014 | Groene et al. | |
| D708,527 S | 7/2014 | Boffi | |
| D719,158 S | 12/2014 | Akana et al. | |
| D724,424 S | 3/2015 | Wilk | |
| D726,139 S | 4/2015 | Park et al. | |
| D728,561 S | 5/2015 | Park et al. | |
| D729,122 S | 5/2015 | Lee et al. | |
| D729,235 S | 5/2015 | Nagao et al. | |
| 9,311,792 B2* | 4/2016 | Kosonen | G08B 6/00 |
| 9,424,722 B2* | 8/2016 | Adrezin | G08B 13/08 |
| 9,513,665 B2* | 12/2016 | Magi | G06F 1/163 |
| 2003/0181116 A1* | 9/2003 | Van Heerden | G06F 3/016 |
| | | | 442/182 |
| 2006/0037359 A1 | 2/2006 | Stinespring | |
| 2013/0055761 A1 | 3/2013 | Alford et al. | |
| 2014/0360228 A1 | 12/2014 | Cochrane | |
| 2015/0091711 A1* | 4/2015 | Kosonen | G08B 6/00 |
| | | | 340/407.1 |
| 2016/0255944 A1* | 9/2016 | Baranski | A44C 5/0069 |

OTHER PUBLICATIONS

"Miga Motor Company: Modern Motion: Shape Memory Alloy Actuators," http://www.migamotors.com, printed Jan. 16, 2014, 1 page.

"Robot design—flexinol and other nitinol muscle wires," http://robotics.hobbizine.com/flexinol.html, printed Nov. 11, 2013, 5 pages.

"Shape Memory Alloys," http://webdocs.cs.ualberta.ca/~database/MEMS/sma_mems/sma.html, printed Nov. 11, 2013, 4 pages.

"Shape-memory alloy," Wikipedia, http://en.wikipedia.org/wiki/Shape_memory_alloy, printed Nov. 11, 2013, 8 pages.

"Shape-memory polymer," Wikipedia, http://en.wikipedia.org/wiki/Shape-memory_polymer, printed Nov. 12, 2013, 7 pages.

"Flexinol® Actuator Wire Technical and Design Data," Dynalloy, Inc.; http://www.dynalloy.com/TechDataWire.php; printed Jan. 16, 2014, 1 page.

"TZ SMA Actuators Actuation Technology Aero Asset Maintainability Inc." http://aam.tz.net/sma-actuators, printed Jan. 16, 2014, 1 page.

"Understanding shape-shifting polymers," MIT News, http://web.mit.edu/newsoffice/2010/memory-polymer-1206.html, printed Nov. 12, 2013, 3 pages.

"Adidas jumps into wearable computing, announces new $399 smartwatch at Mobilize," http://gigaom.com/2013/10/16/adidas-shows-off-new-smartwatch-that-provides-personal-coaching, printed Jan. 16, 2014, 5 pages.

"High tech meets high fashion," Los Angeles Times, http://articles.latimes.com/2013/may/26/image/la-ig-tech-fashion-20130526, printed Jan. 16, 2014, 3 pages.

USPTO Non Final Office Action in U.S. Appl. No. 29/477,896 dated Jun. 25, 2015.

USPTO Notice of Allowance in U.S. Appl. No. 29/477,896 dated Oct. 15, 2015.

Rakuten Global Market. Kagami Rounded Design Full Length Mirrror. 2015 [online], [site visited Sep. 30, 2015]. Available from Internet. URL:http://global.rakuten.com/en/store/hello-furniture/item/do-021/.

USPTO Non Final Office Action in U.S. Appl. No. 29/477,900 dated Jul. 17, 2015.

DIY Trade. Double Wire Hose Clamps—Shishan. Mar. 18, 2011 [online], [site visited Jun. 18, 2015]. Available from Internet, URL:http://www.diytrade.com/china/pd/7835209/Double_Wire_Hose_Clamps.html.

USPTO Final Office Action in U.S. Appl. No. 29/477,900 dated Nov. Jul. 17, 2015.

* cited by examiner

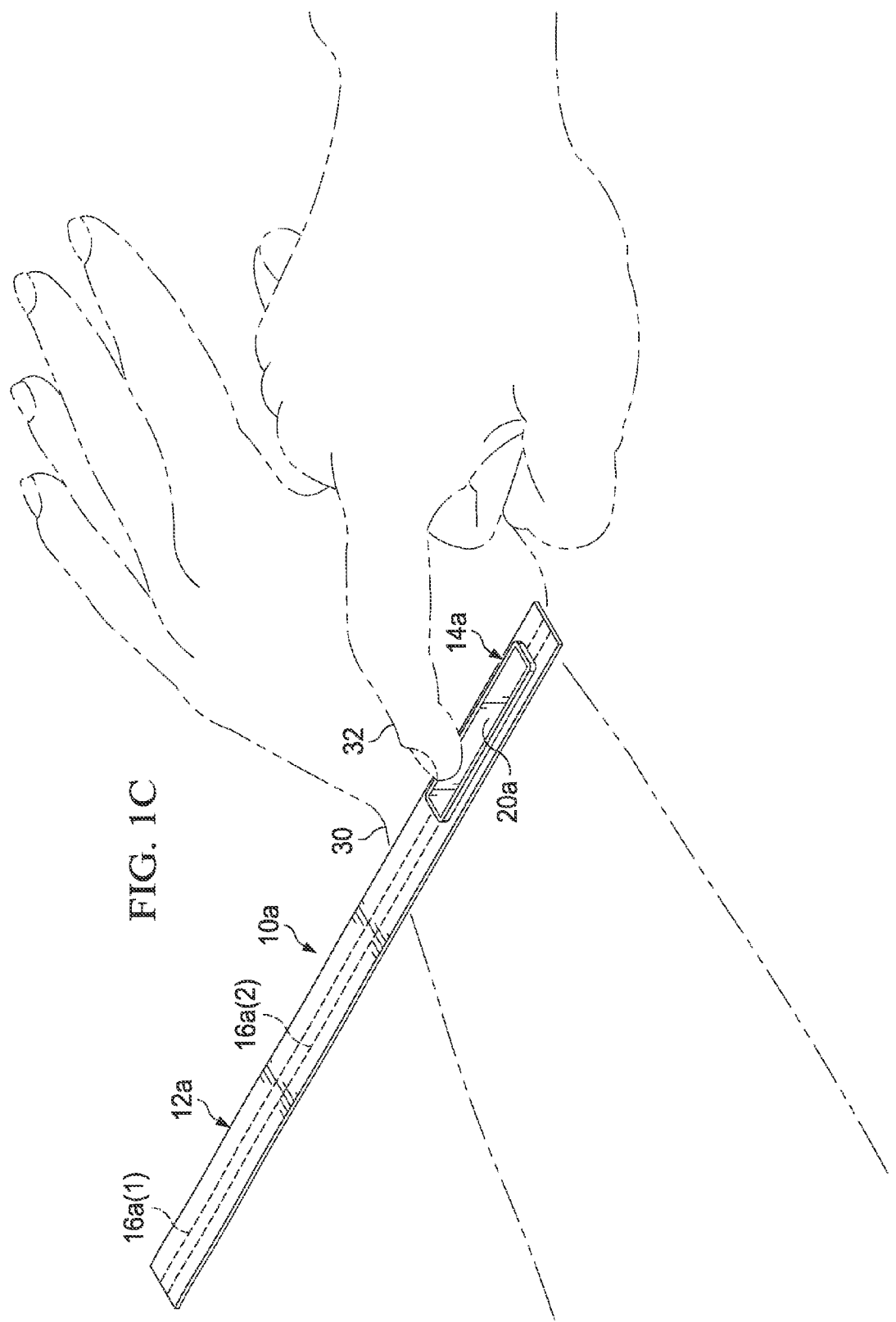

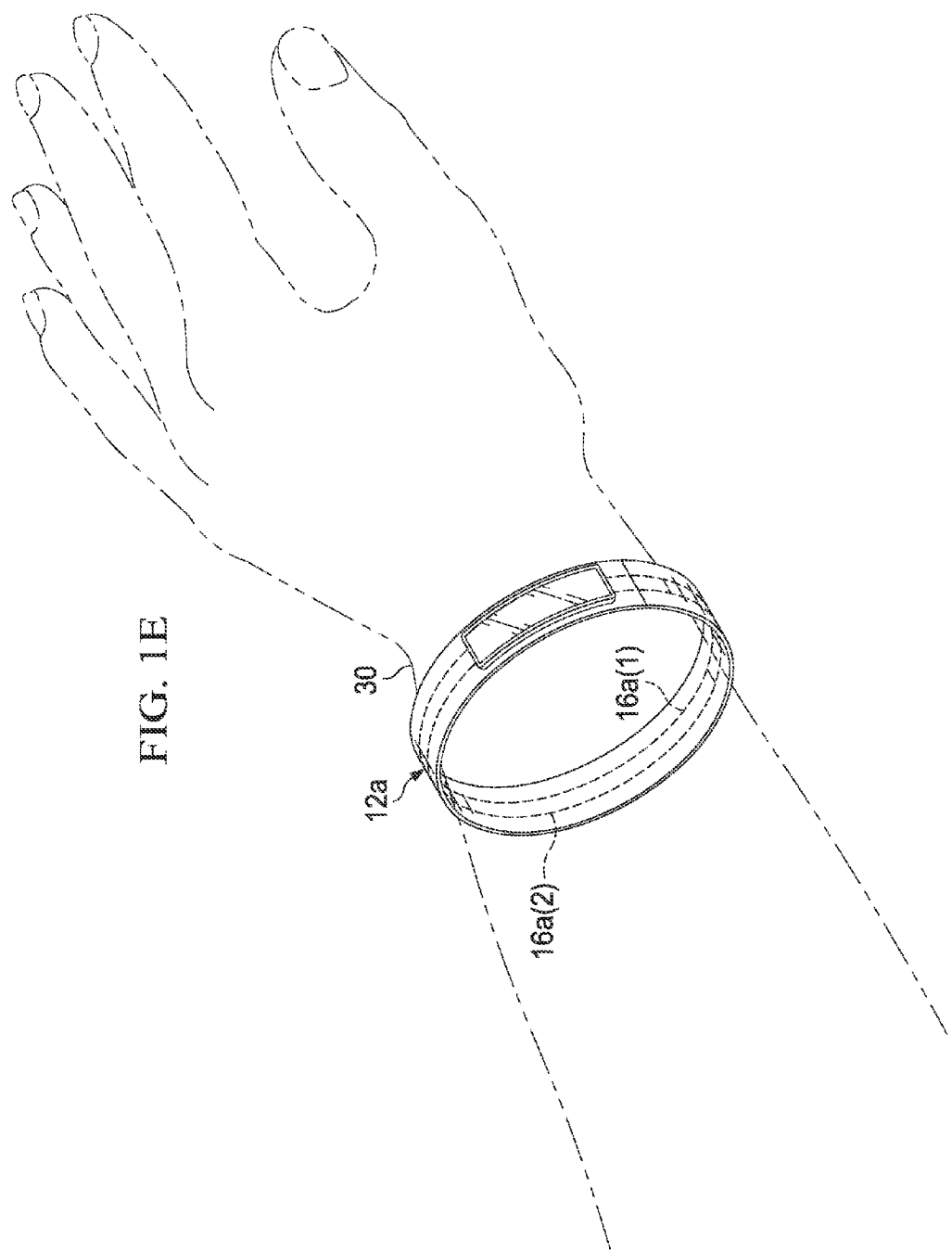

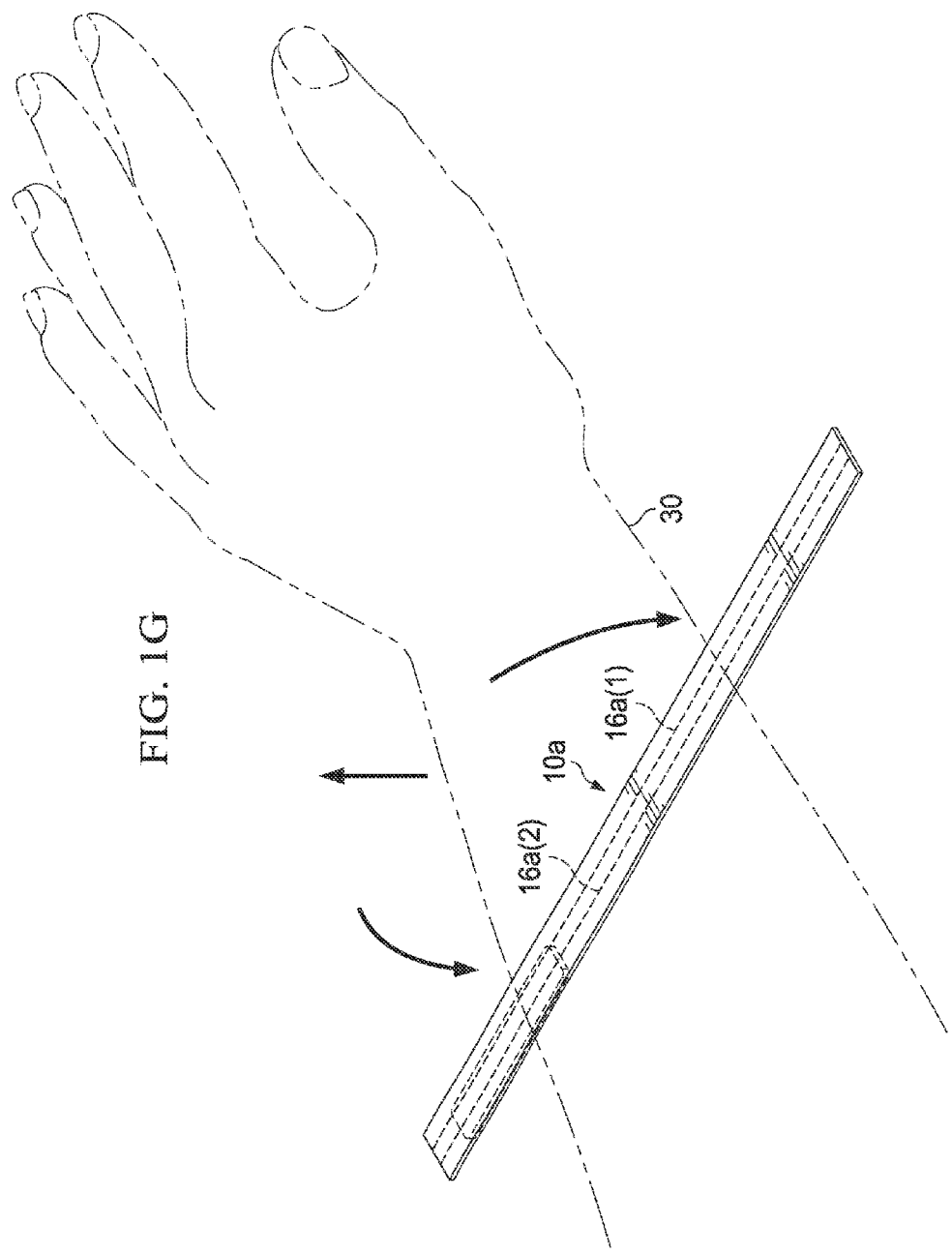

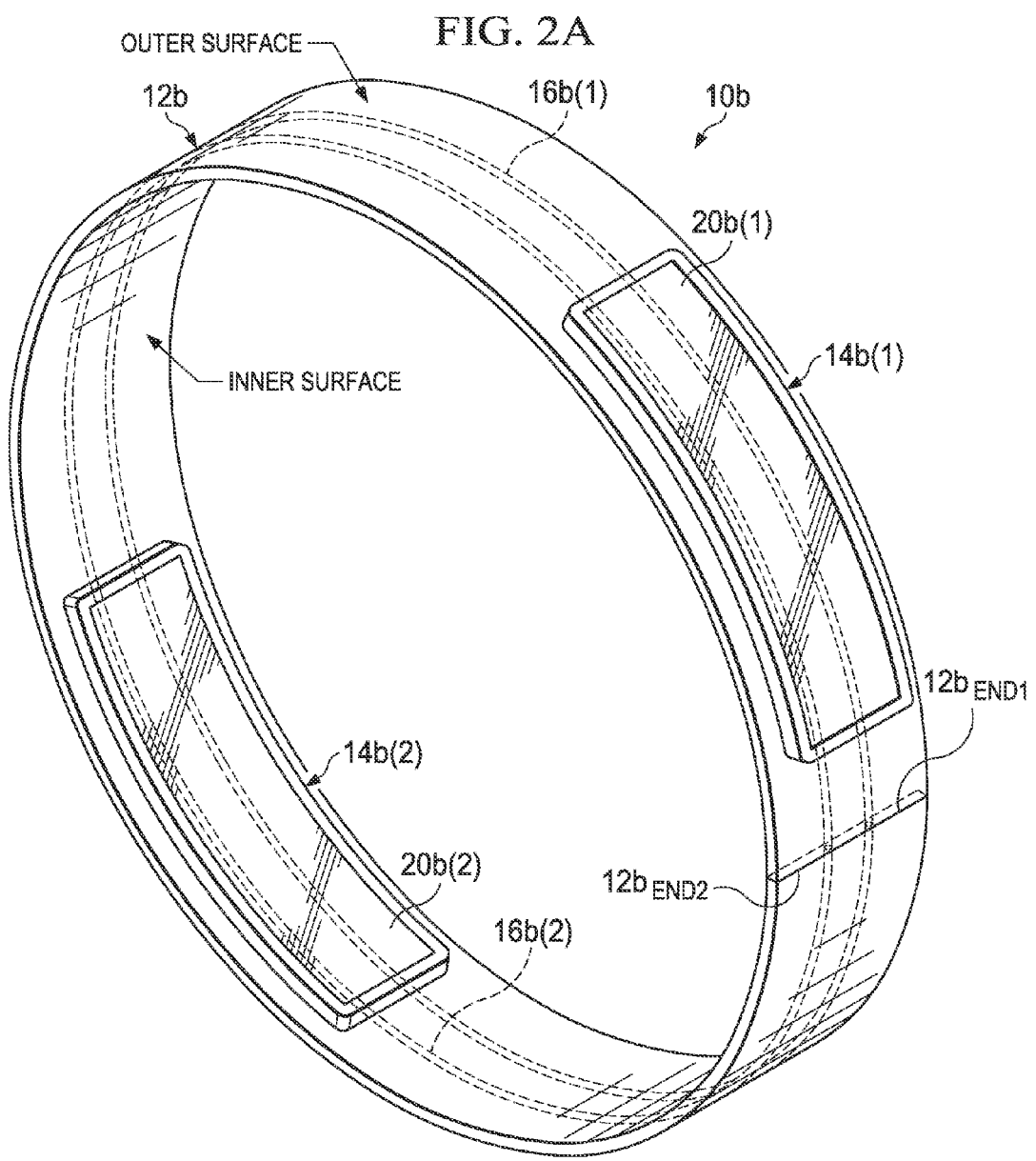

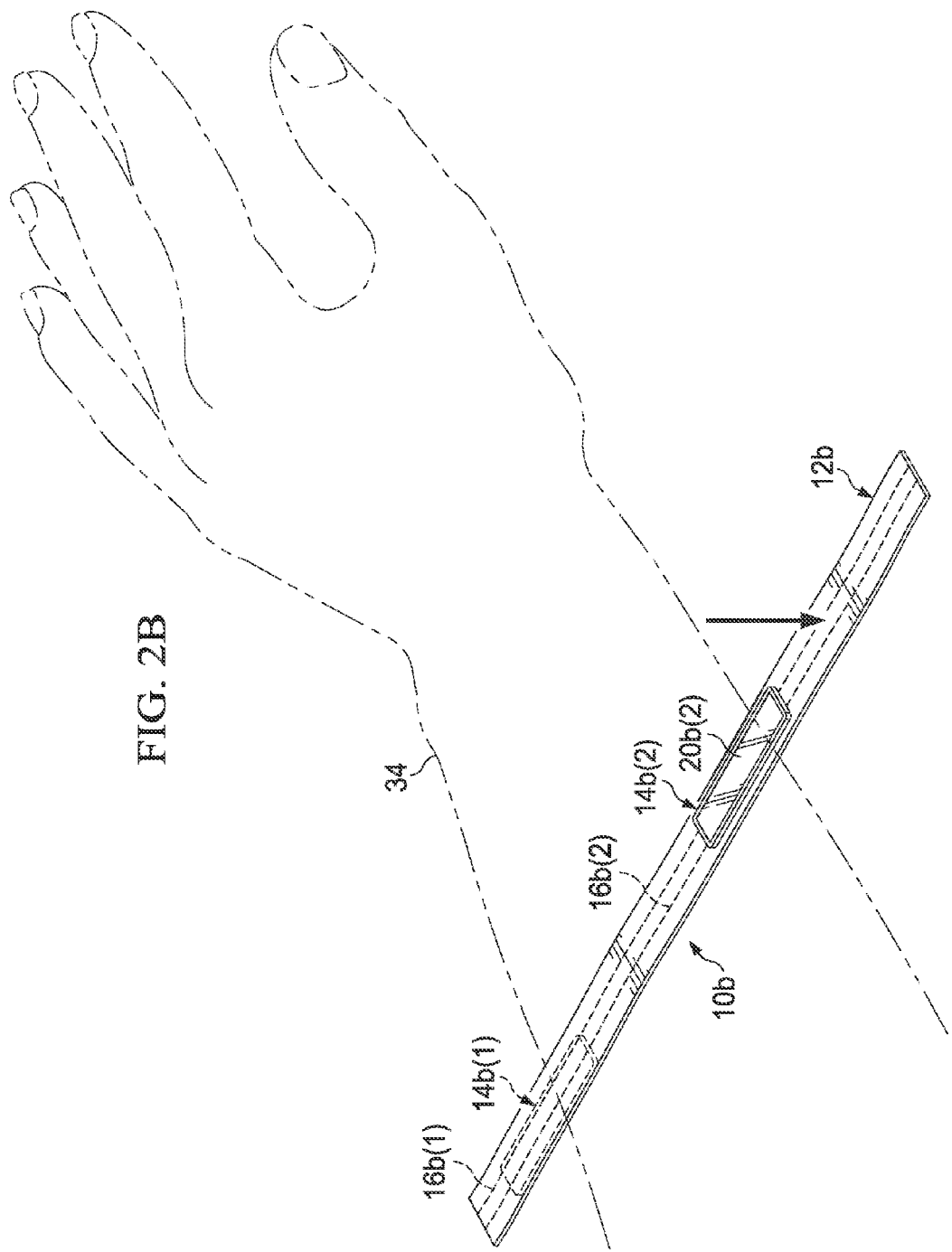

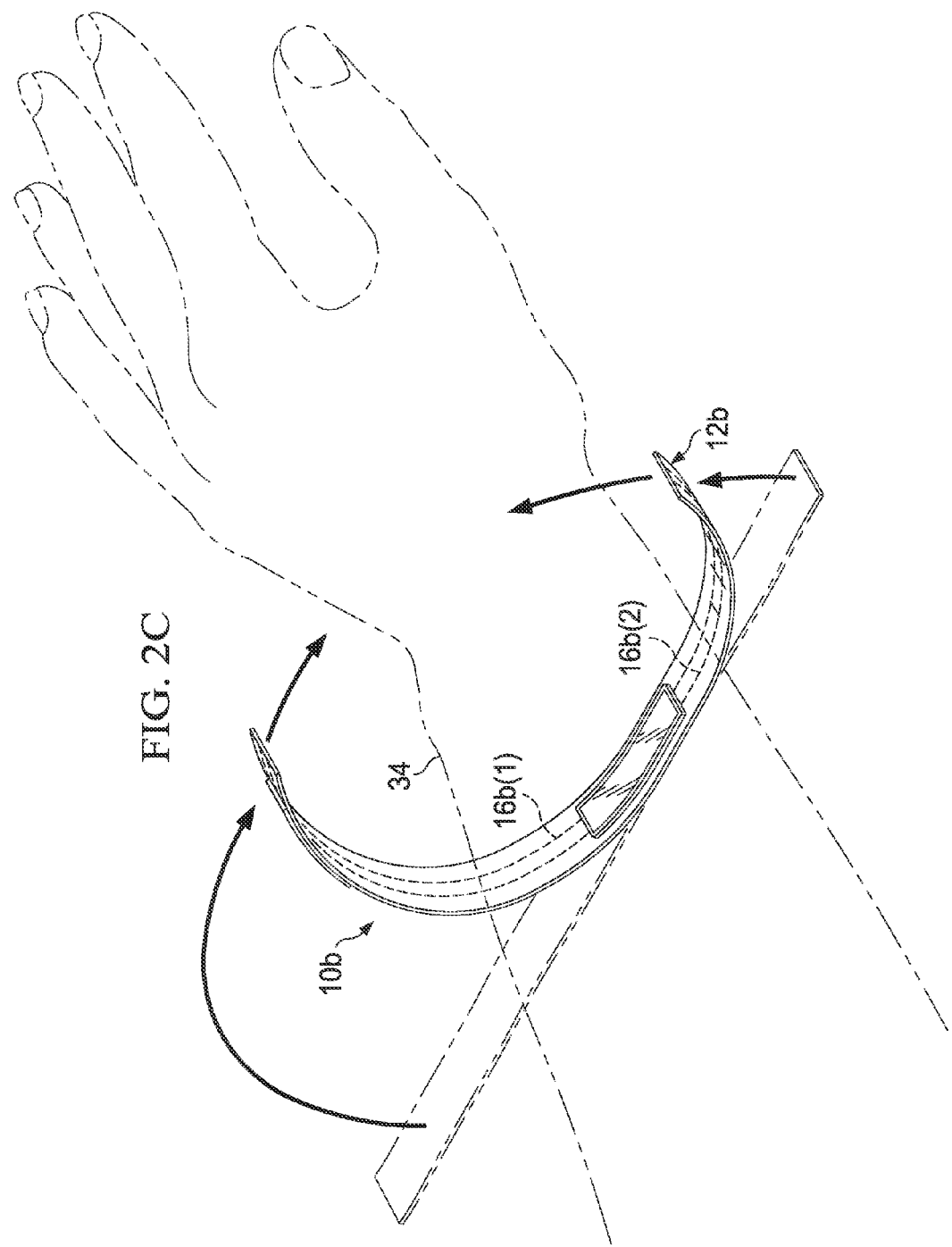

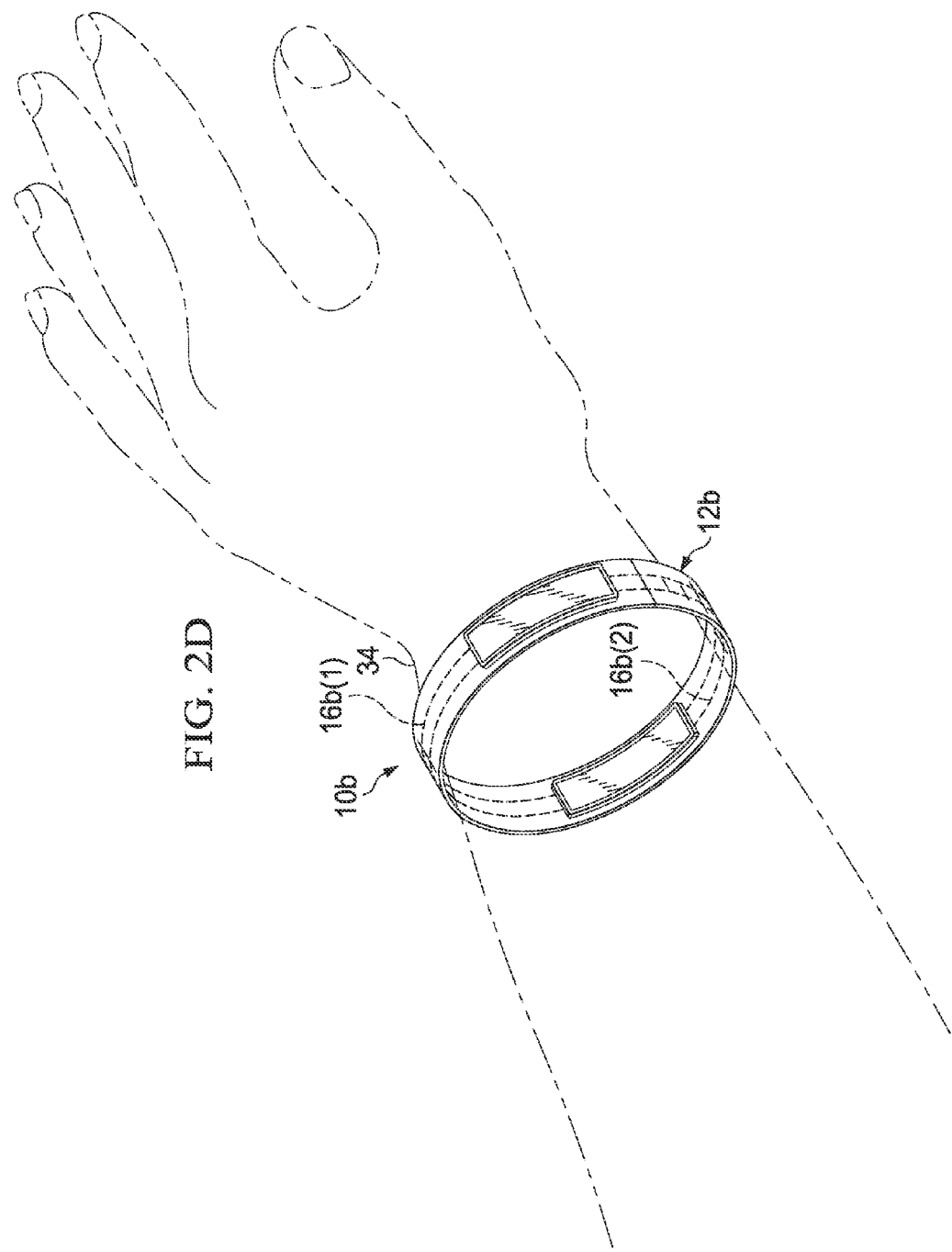

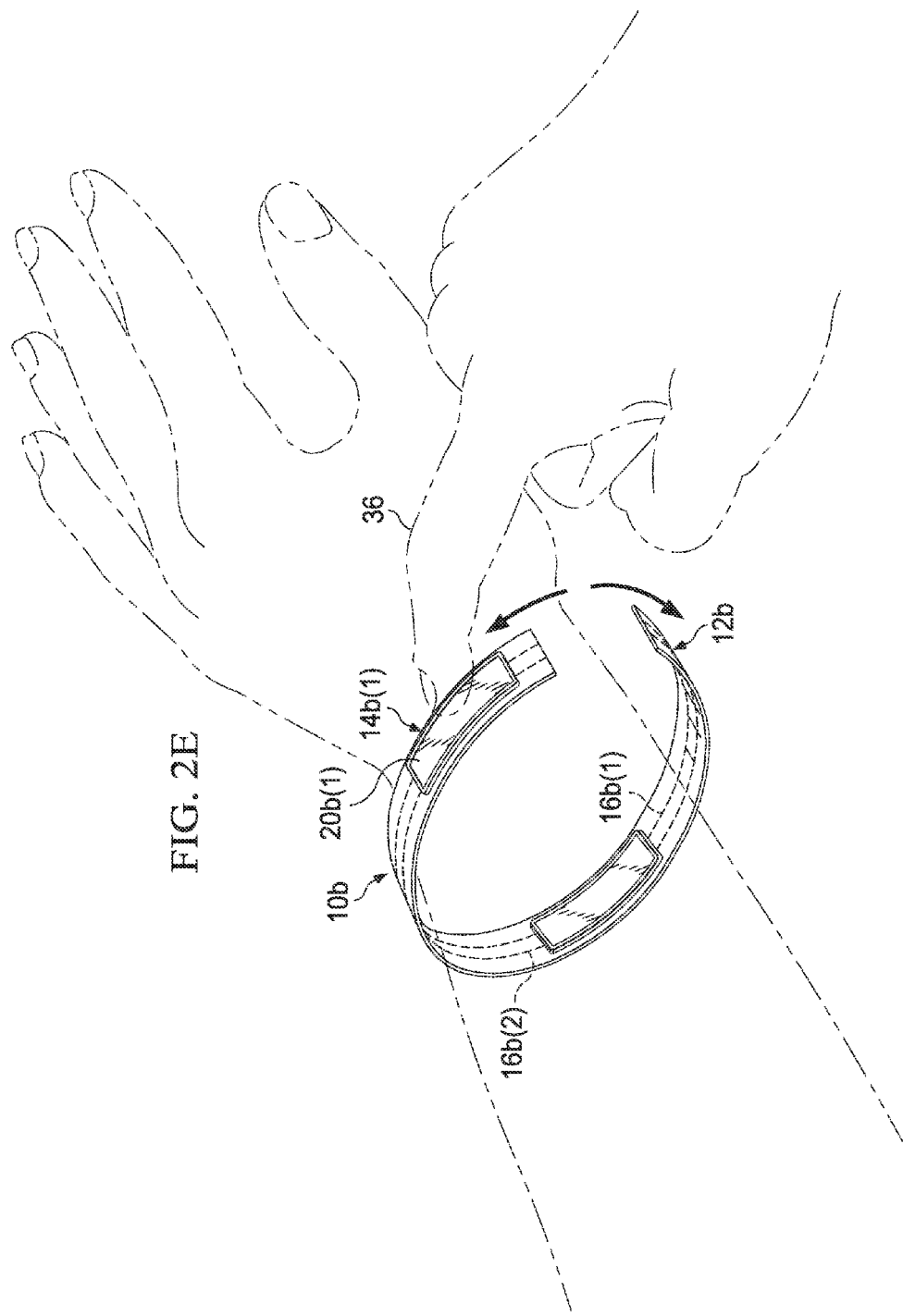

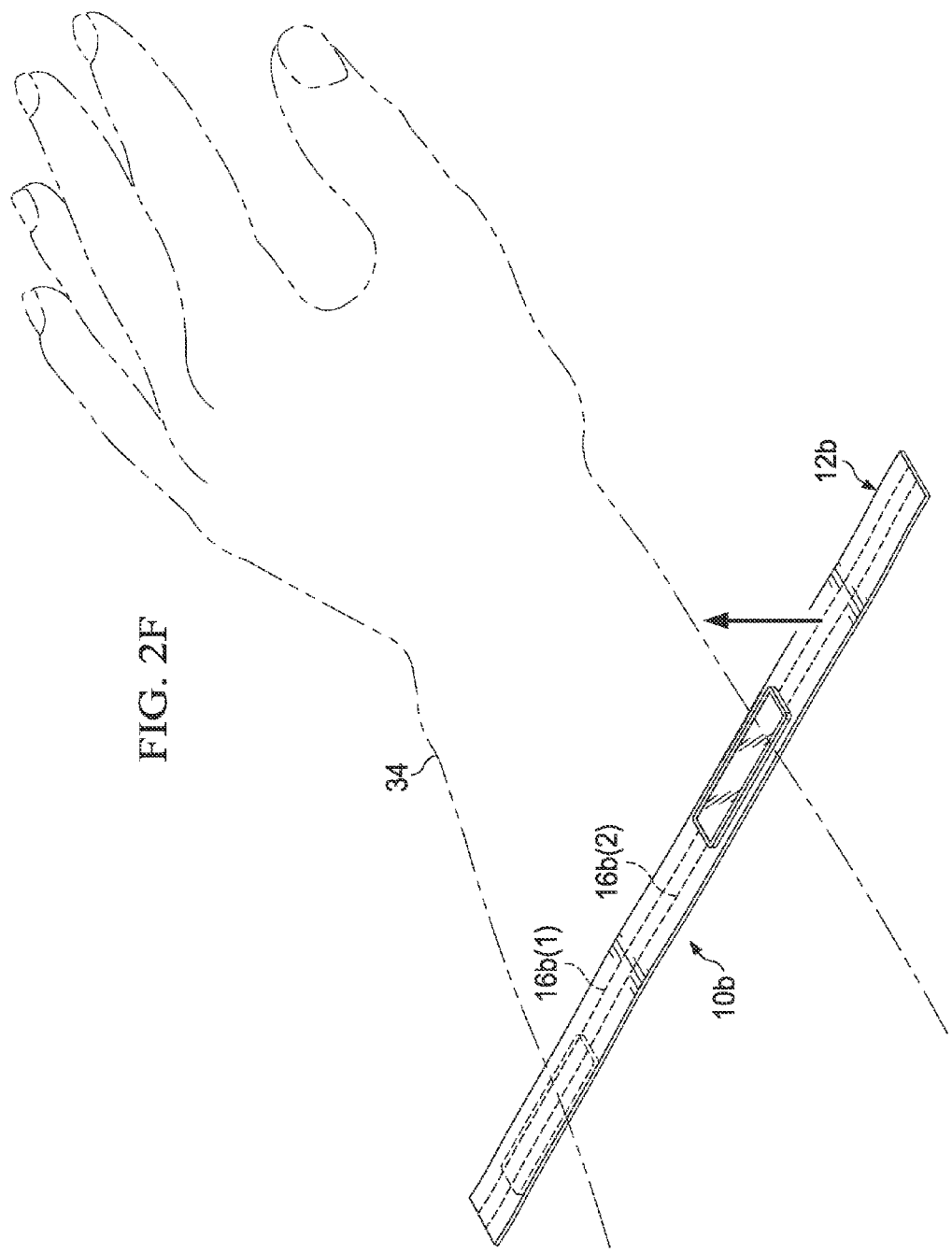

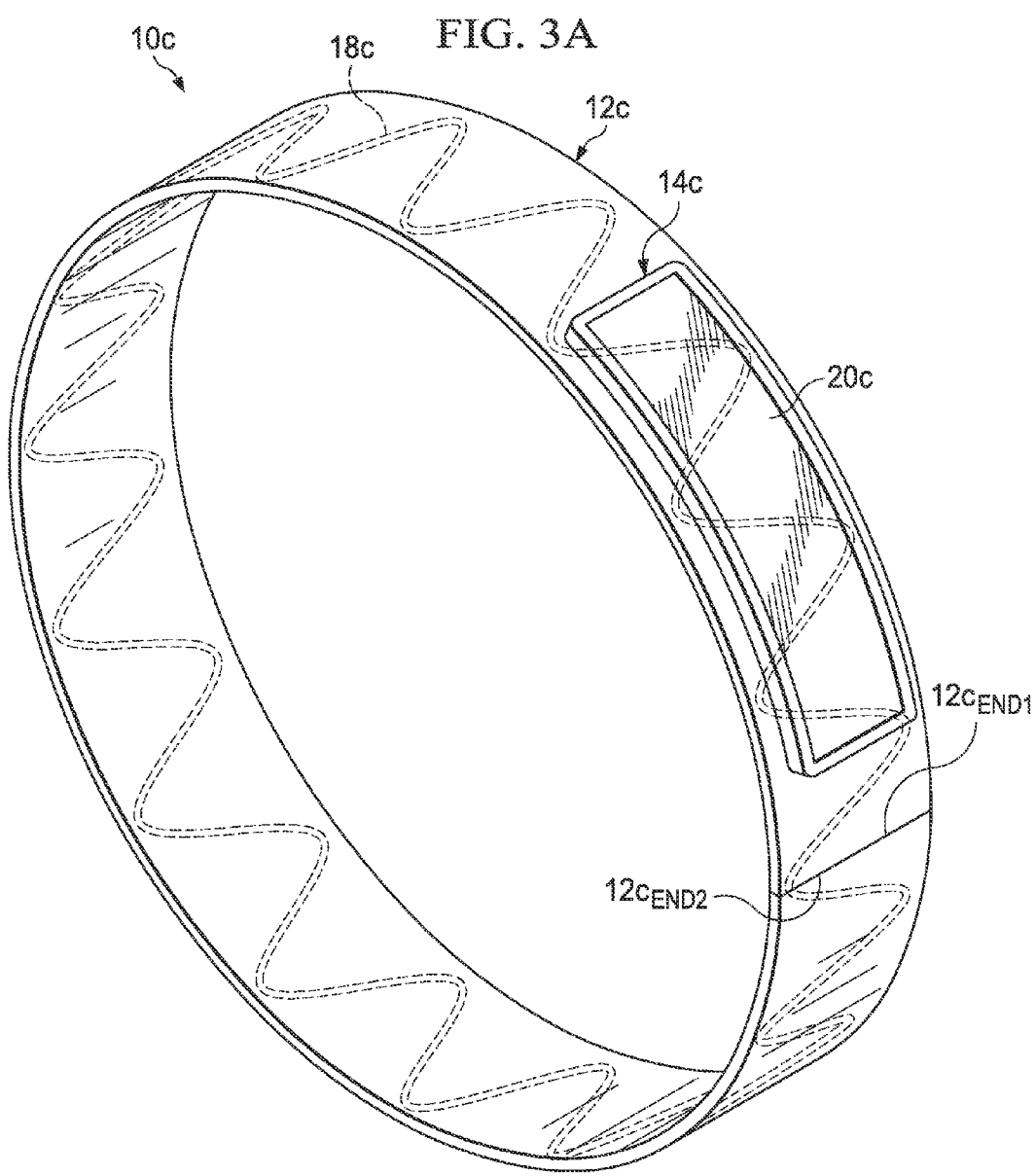

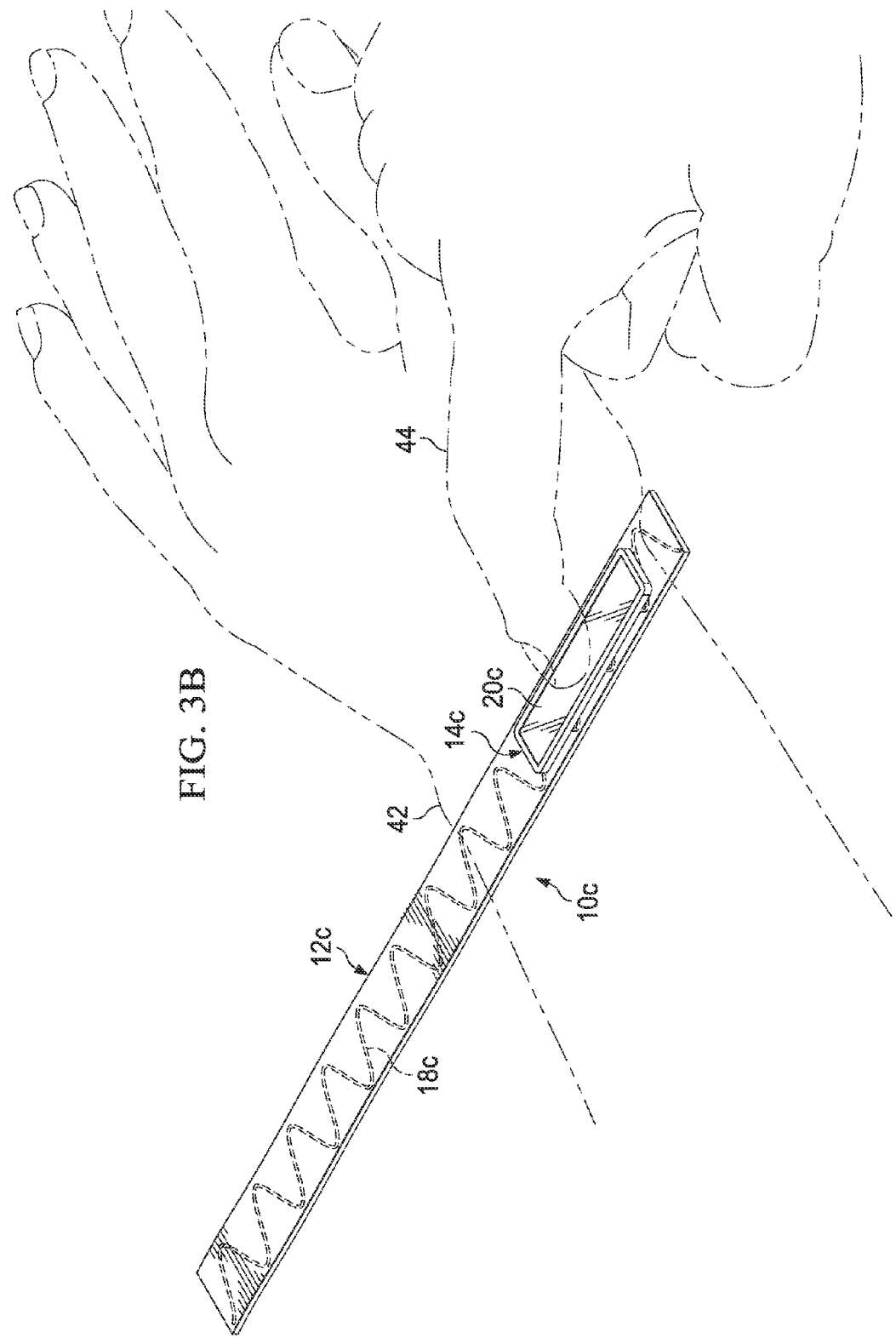

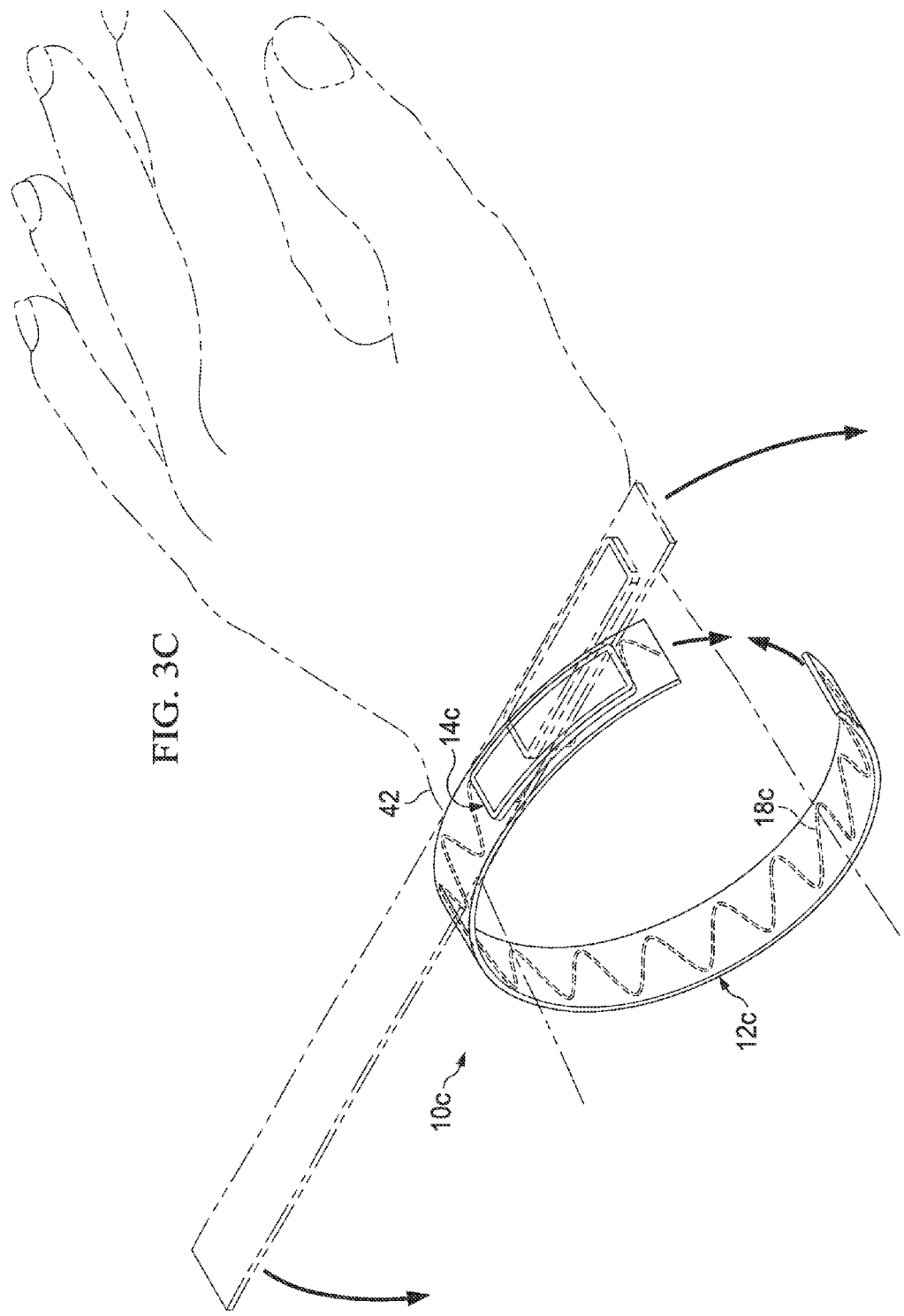

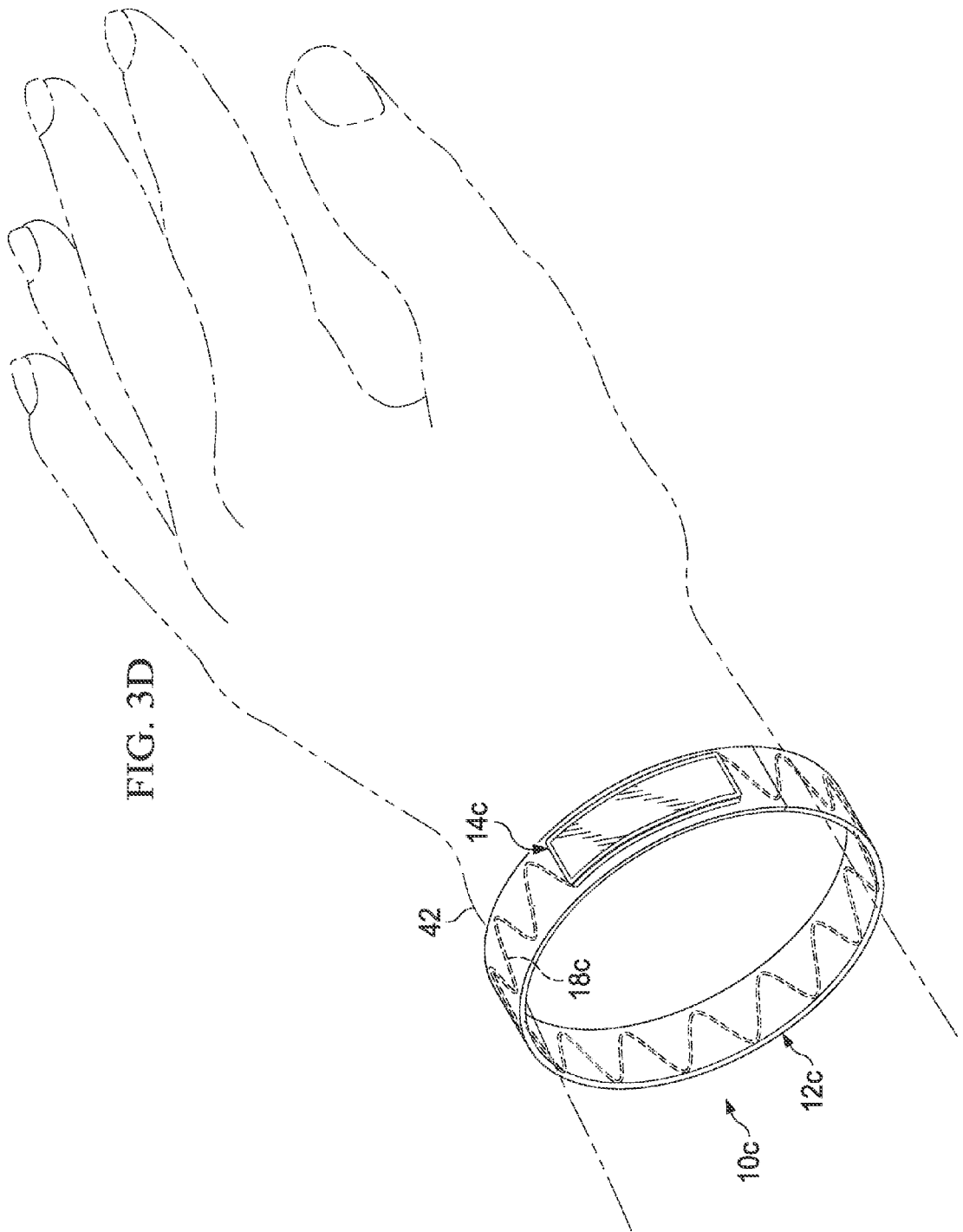

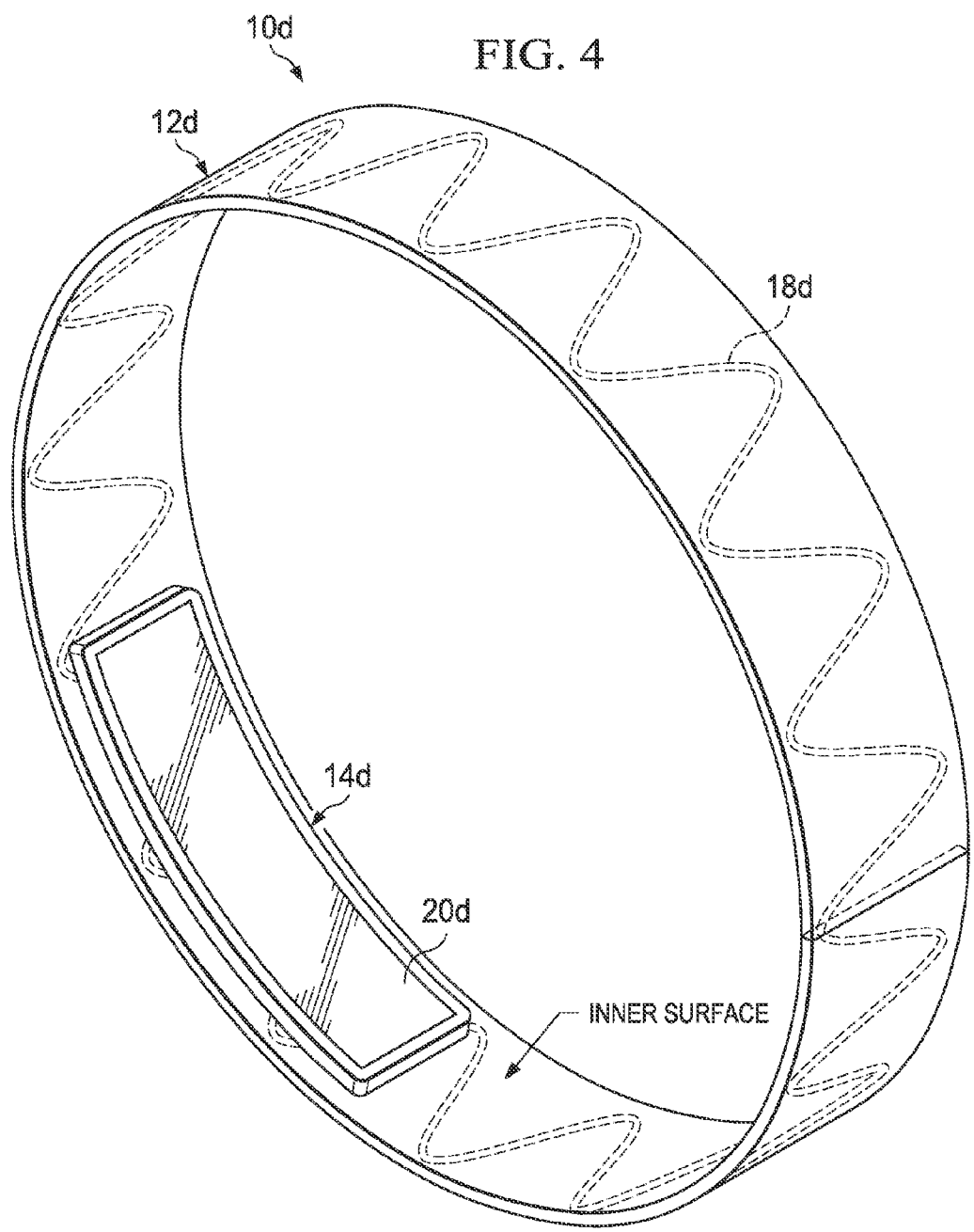

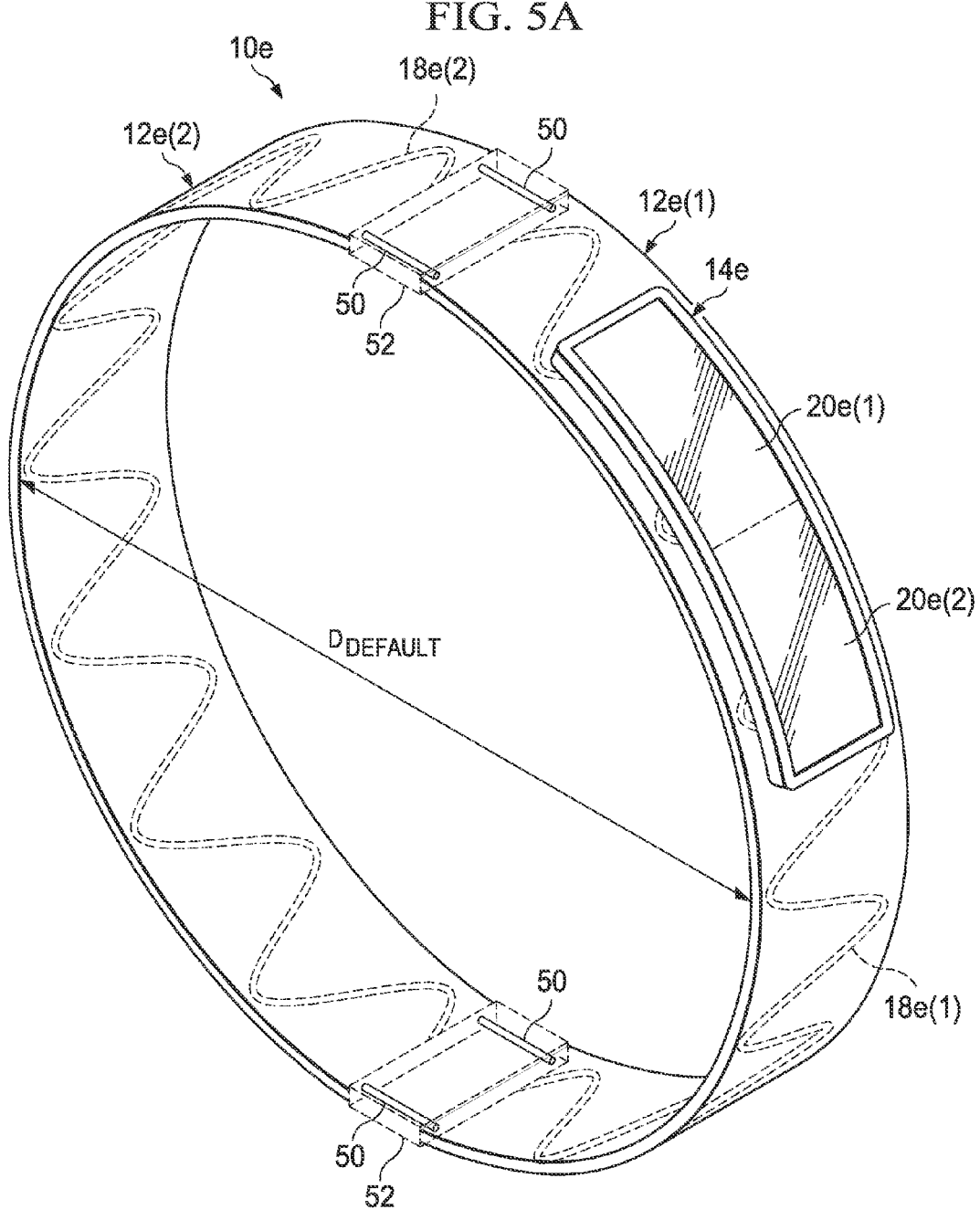

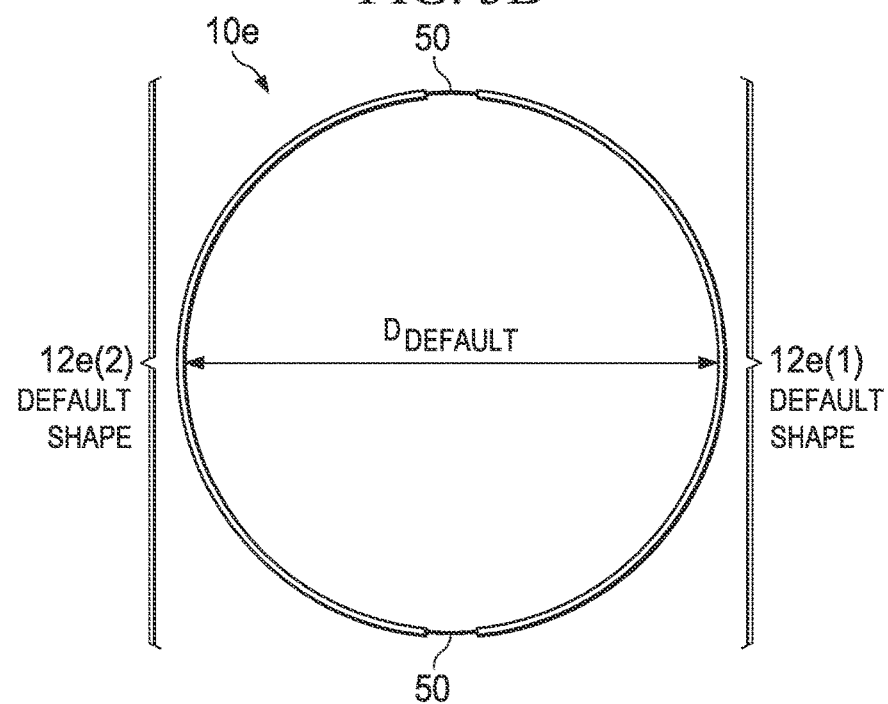
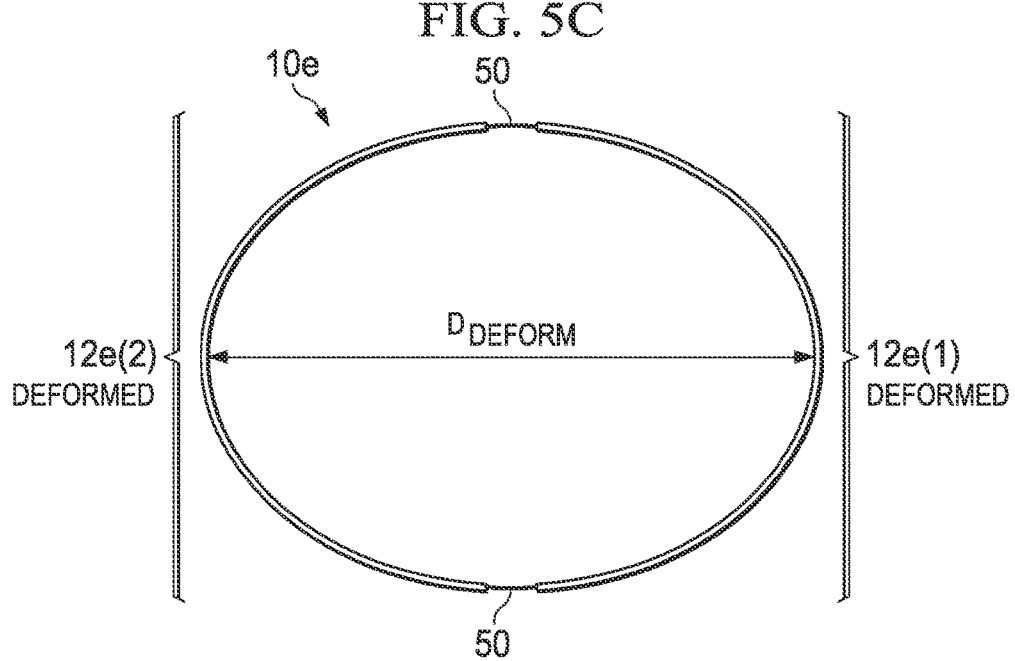

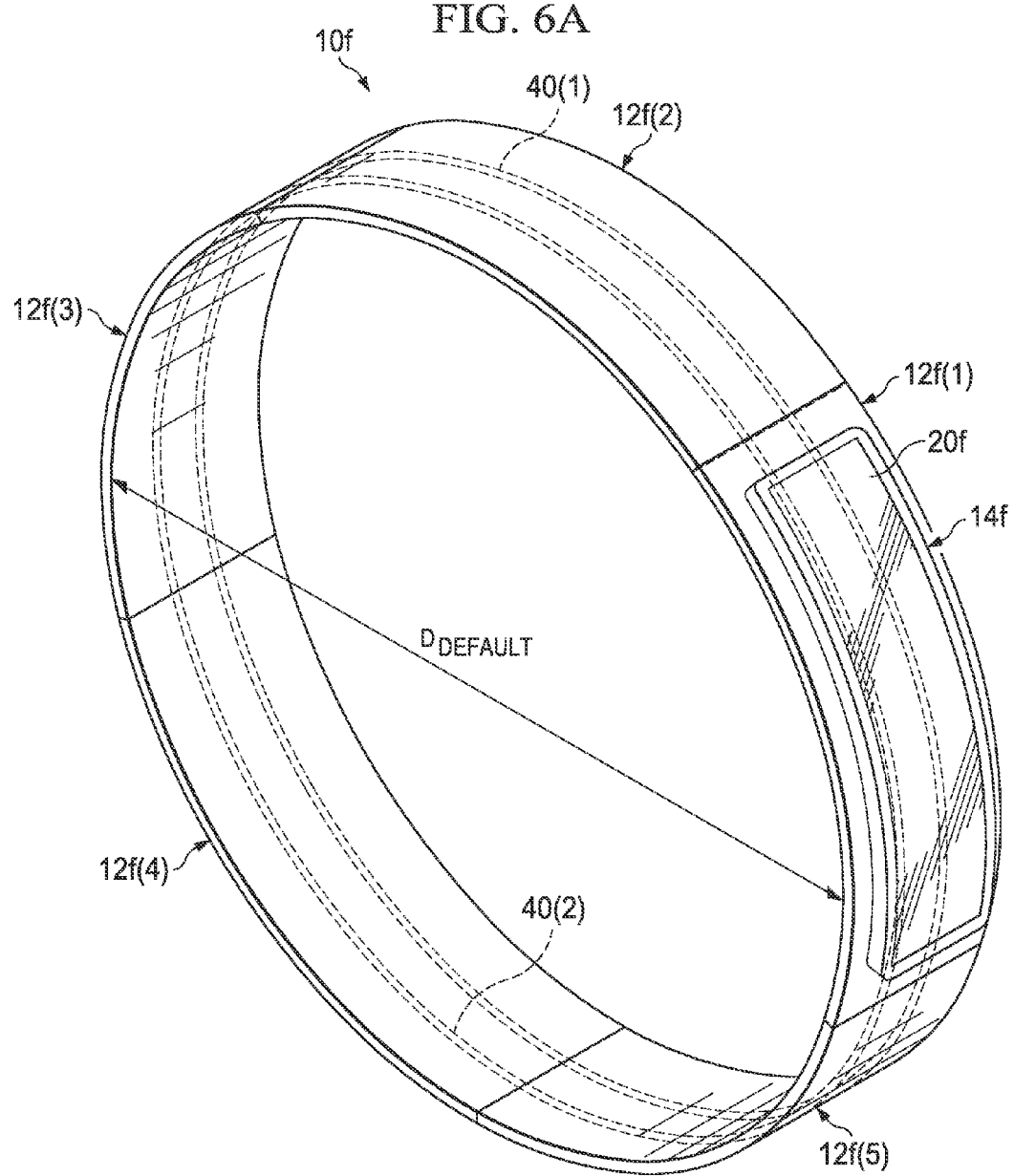

WEARABLE ELECTRONIC DEVICE INCLUDING A SHAPE MEMORY MATERIAL FOR OPENING, CLOSING OR ADJUSTING STRAP PORTIONS OF THE WEARABLE ELECTRONIC DEVICE

TECHNICAL FIELD

Embodiments described herein generally relate to a wearable electronic device including a shape memory material for opening, closing or adjusting strap portions of the wearable electronic device.

BACKGROUND

End users have more electronic device choices than ever before. A number of prominent technological trends are currently afoot (e.g., mobile electronic devices, smaller electronic devices, increased user connectivity, etc.), and these trends are changing the electronic device landscape. One of the technological trends is electronic devices that can be worn by users, sometimes referred to as wearable electronic devices. Wearable electronic devices can be worn on a user's wrist, arm, ankle, etc. Wearable electronic devices are quickly becoming a member of the technological ecosystem; however, interactions between device and user have yet to be streamlined. To attach a wearable electronic device to a user, say, for example, to the user's wrist, typically requires multiple steps by the user to physically wrap straps for the device around the user's wrist and then to secure the straps together to keep the device from becoming detached from the user's wrist. To detach the wearable electronic device typically requires the same steps in reverse. Adjusting the fit or size of the device requires similar physical maneuvering. Some users experience discomfort and inefficiencies performing the physical steps required for attaching, removing and/or adjusting the size of wearable electronic devices. Hence there is a desire to improve the means for attaching, removing and/or adjusting the size of wearable electronic devices.

BRIEF DESCRIPTION OF THE DRAWINGS

Embodiments are illustrated by way of example and not by way of limitation in the FIGURES of the accompanying drawings, in which like references indicate similar elements and in which:

FIG. 1C is a simplified orthographic view illustrating an embodiment of a wearable electronic device, in accordance with one embodiment of the present disclosure;

FIG. 1E is a simplified orthographic view illustrating an embodiment of a wearable electronic device, in accordance with one embodiment of the present disclosure;

FIG. 1G is a simplified orthographic view illustrating an embodiment of a wearable electronic device, in accordance with one embodiment of the present disclosure;

FIG. 2A is a simplified orthographic view illustrating an embodiment of a wearable electronic device, in accordance with one embodiment of the present disclosure;

FIG. 2B is a simplified orthographic view illustrating an embodiment of a wearable electronic device, in accordance with one embodiment of the present disclosure;

FIG. 2C is a simplified orthographic view illustrating an embodiment of a wearable electronic device, in accordance with one embodiment of the present disclosure;

FIG. 2D is a simplified orthographic view illustrating an embodiment of a wearable electronic device, in accordance with one embodiment of the present disclosure;

FIG. 2E is a simplified orthographic view illustrating an embodiment of a wearable electronic device, in accordance with one embodiment of the present disclosure;

FIG. 2F is a simplified orthographic view illustrating an embodiment of a wearable electronic device, in accordance with one embodiment of the present disclosure;

FIG. 3A is a simplified orthographic view illustrating an embodiment of a wearable electronic device, in accordance with one embodiment of the present disclosure;

FIG. 3B is a simplified orthographic view illustrating an embodiment of a wearable electronic device, in accordance with one embodiment of the present disclosure;

FIG. 3C is a simplified orthographic view illustrating an embodiment of a wearable electronic device, in accordance with one embodiment of the present disclosure;

FIG. 3D is a simplified orthographic view illustrating an embodiment of a wearable electronic device, in accordance with one embodiment of the present disclosure;

FIG. 4 is a simplified orthographic view illustrating an embodiment of a wearable electronic device, in accordance with one embodiment of the present disclosure;

FIG. 5A is a simplified orthographic view illustrating an embodiment of a wearable electronic device, in accordance with one embodiment of the present disclosure;

FIG. 5B is a simplified side view illustrating an embodiment of a wearable electronic device, in accordance with one embodiment of the present disclosure;

FIG. 5C is a simplified side view illustrating an embodiment of a wearable electronic device, in accordance with one embodiment of the present disclosure;

FIG. 6A is a simplified orthographic view illustrating an embodiment of a wearable electronic device, in accordance with one embodiment of the present disclosure;

Figure 1A:
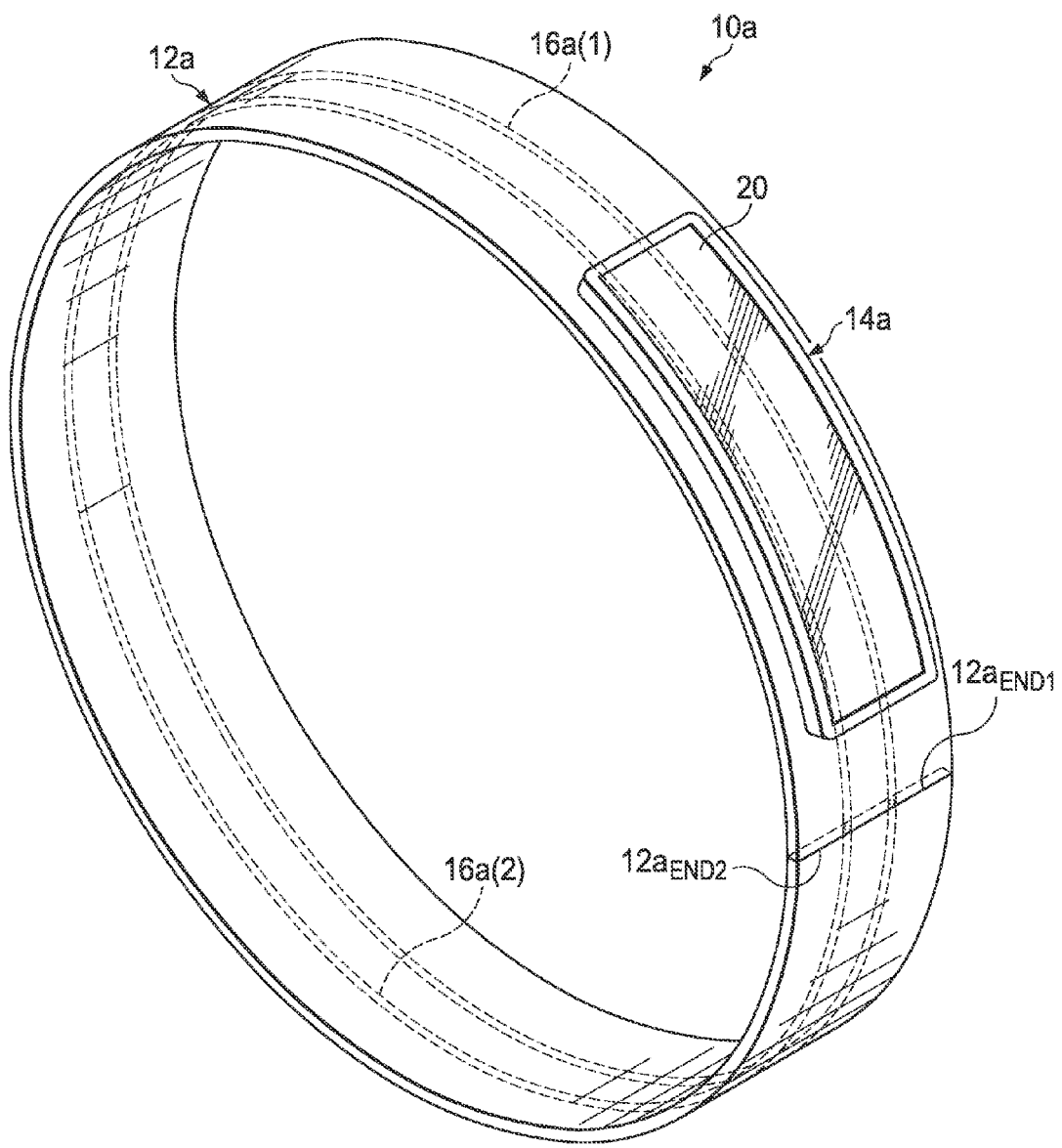
FIG. 1A is a simplified orthographic view illustrating an embodiment of a wearable electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include one or more strap portions, wherein each of the one or more strap portions comprise a shape memory material, which has a default shape, and wherein at least one strap portion further comprises at least one input element configured to register one or more inputs; and logic configured to receive input data based the one or more inputs and to manipulate, based, at least in part, on the input data, the shape memory material for each of the one or more strap portions from a deformed shape back to its default shape.

Note, that in at least one embodiment the shape memory material can be a shape memory alloy (SMA) configured within each of the one or more strap portions as at least one first SMA wire that has a first default shape that corresponds to a closed configuration for the wearable electronic device and at least one second SMA wire that has a second default shape that corresponds to an opened configuration for the wearable electronic device, and wherein the logic is further configured to separately apply, based, at least in part on the input data, a current to each of the at least one first SMA wire or the at least one second SMA wire to open or close a particular strap portion of the wearable electronic device. Note also, that in at least one embodiment, that each of the one or more strap portions can be made of the shape memory material, which is a shape memory polymer, and wherein the logic is further configured to manipulate, based on the input data, each of the one or more strap portions to their respective default shapes by applying a current to a heating device configured within each of the one or more strap portions.

In another example implementation, the wearable electronic device may include logic, at least a portion of which is partially implemented in hardware, the logic configured to receive input data for one or more inputs registered by one or more input elements; and manipulate, based, at least in part, on the input data, a shape memory material from a deformed shape to a default shape for each of one or more strap portions of the wearable electronic device, wherein each of the one or more strap portions comprise the shape memory material.

Example Embodiments

The following detailed description sets forth example embodiments of apparatuses, methods, and systems relating to shape memory material configurations and/or manipulations for a wearable electronic device. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of a wearable electronic device $10a$ in accordance with one embodiment of the present disclosure. Wearable electronic device $10a$ can include a strap portion $12a$, which may contain an input portion $14a$ and a pair of wires made of a shape memory alloy (SMA), a first SMA wire $16a(1)$ and a second SMA wire $16a(2)$. Strap portion $12a$ may have an outer surface and an inner surface. Input portion $14a$ may include an input element $20a$. Wearable electronic device $10a$, as shown in FIG. 1A is in a closed configuration having a pair of opposing ends, a first $12a_{END1}$ and a second end $12a_{END2}$ of strap portion $12a$, which may be in contact with each other. In one or more embodiments, input portion $14a$ can be disposed within/on strap portion $12a$.

In one or more embodiments, first and second SMA wires $16a(1)$, $16a(2)$ may provide a means for opening and closing wearable electronic device $10a$ in order to attach and detach wearable electronic device $10a$ from a user (e.g., a user's wrist, arm, ankle, etc.). SMAs, which are sometimes referred to muscle wire or smart metal, are alloys with austenitic/martensitic phase transition properties that can shape-shift from a deformed shape to a default shape upon application of an external stimulus, such as heat or current, to the SMA to 'reset' the SMA back to its default shape. In one or more embodiments, first and second SMA wires $16a(1)$, $16a(2)$ may be capable of being deformed by both bending and stretching actions. In one or more embodiments, first and second SMA wires $16a(1)$, $16a(2)$ can hold a deformed shape until it is reset back to its respective default shape. In one or more embodiments, first and second SMA wires $16a(1)$, $16a(2)$ may be implemented in rod or ribbon form in wearable electronic device $10a$. In one or more embodiments, first and second SMA wires $16a(1)$, $16a(2)$ can be formed of alloys, which can include, but not be limited to Nickel and Titanium alloys; Copper, Aluminum and Nickel; Copper, Zinc and Aluminum alloys or other alloys which may contain Zinc, Copper, Gold and/or Iron.

A shape may be 'set' for each of the first and second SMA wires $16a(1)$, $16a(2)$ by annealing the SMA wires while set in a desired default shape. Thereafter, once deformed, each of the first and second SMA wires $16a(1)$ and $16a(2)$ can be reset back to its respective default shape through application of a current to each of the first or second SMA wire $16a(1)$, $16a(2)$.

First SMA wire $16a(1)$ may be set to have a default curved shape, which may correspond to the closed configuration for wearable electronic device $10a$. Second SMA wire $16a(2)$ may be set to have a default flat shape, which may correspond to an opened configuration for wearable electronic device $10a$. In one or more embodiments, a current may be applied to first SMA wire $16a(1)$ or second SMA wire $16a(2)$ from a current source (e.g., battery, capacitor, circuitry, etc.) in an independent manner in order to, respectively, manipulate each SMA wire from a deformed shape back to its default shape. For example, a current may be applied to first SMA wire $16a(1)$ to bring the ends of strap portion $12a$ together for attaching wearable electronic device to a user. Conversely, a current may be applied to second SMA wire $16a(2)$ to pull the ends of strap portion $12a$ apart for detaching or removing wearable electronic device $10a$ from the user.

In one or more embodiments, the current can range from approximately 40 mA to approximately 4000 mA, which can vary based on alloy, diameter, length, shape, etc. of first and second SMA wires $16a(1)$, $16a(2)$. In one or more embodiments, the current for the first and second SMA wires 16a(1), 16a(2) can be the same or different depending on the alloy, size, shape, length, etc. of the first and second SMA wires 16a(1), 16a(2). In one or more embodiments, first and second SMA wires 16a(1), 16a(2) can range in diameter from approximately 0.025 mm to approximately 0.50 mm. In various diameters, SMA wires may provide a force capable of pulling or pushing approximately 0.2 to approximately 7.8 pounds of weight. Although shown in a wire form, it should be understood that SMAs for use in wearable electronic device 10a may also be in rod or ribbon form and configured accordingly for strap portion 12a. In one or more embodiments, the diameter of first and second SMA wires 16a(1), 16a(2) may be varied by a designer based on dimensions and materials chosen for wearable electronic device. In one or more embodiments, first and second SMA wires 16a(1), 16a(2) may be surrounded by an insulating coating or layer within strap portion 12a.

In one or more embodiments, wearable electronic device 10a may be opened or closed based, at least in part, on one or more user inputs that may be registered by input element 20a. In one or more embodiments, input portion 14a and input element 20a may be made of flexible materials to bend with strap portion 12a. In one or more embodiments, input element 20a can be a touchscreen such as a capacitive or a resistive touchscreen to register one or more touch inputs. In one or more embodiments, input element 20a may also be capable of registering one or more interactions, gestures or the like performed near input element 20a through use of an optical sensor and associated gesture recognition circuitry, logic, etc., which can be included in input portion 14a, in order to control opening and closing operations for wearable electronic device 10a. In one or more embodiments, input element 20a could include a microphone to receive voice inputs that could be coupled to appropriate circuitry, voice recognition logic, etc., which can be included in input portion 14a, in order to control opening and closing operations for wearable electronic device 10a. Although input portion 14a is illustrated in FIG. 1A as being placed on the outer surface of strap portion 12a, it could also be contained beneath the outer surface, which may conceal input portion 14a. In one or more embodiments, input portion 14a may include a display screen such as an organic light-emitting diode (OLED) display screen, transparent OLED display screen or any other suitable display screen system, which may allow a user to interact with features and applications of wearable electronic device 10a. The display screen may be flexible to bend with the strap portion 12a.

Example implementations discussed herein reference touch inputs made to input element 20a, which may be configured as a capacitive touchscreen, for ease of explanation only, it should be understood, as discussed above, that input element 20a can be configured to register any type of user inputs: touch, gesture, voice, etc. In one or more embodiments, touches for a touch input element may include a single touch, multiple touches, taps, swipes in one or more directions, or any other form of touch input. For example, in one embodiment, a user may swipe input element 20a in a first direction to initiate closing wearable electronic device 10a and may swipe input element 20a a in a second direction to initiate opening wearable electronic device 10a. In an embodiment, input control logic, which can be configured in wearable electronic device 10a, can output input data (e.g., touch input data for touch inputs, motion input data for motion inputs, voice input data for voice inputs, etc.) corresponding to the one or more inputs made to input element 20a. The input data may be received by shape memory control logic that can be configured in wearable electronic device 10a to apply a current to first SMA wire 16a(1) or second SMA wire 16a(2) to, respectively, close or open wearable electronic device 10a (e.g., pull the ends of strap portion 12a together or pull them apart).

In another embodiment, wearable electronic device may include a proximity sensor and associated proximity sensor logic in one end of strap portion 12a. The proximity sensor may be used to detect whether wearable electronic device is in an open or closed configuration. In response to a touch to input element 20a, shape memory control logic in wearable electronic device 10a may determine, based additionally on proximity sensor data received from the proximity sensor control logic, if the device is open or closed, and may activate current to one of first SMA wire 16a(1) or second SMA wire 16a(2) in order to open or close wearable electronic device 10a, accordingly.

In the closed configuration, first and second ends $12a_{END1}$ and $12a_{END2}$ of strap portion 12a may be held in contact with each other by first SMA wire 16a(1), which may retain its default shape corresponding to the closed configuration even after current is removed from the wire and by second SMA wire 16a(2), which may hold its deformed shape until a current is provided to it in order to open wearable electronic device 10a. In one or more embodiments, a latching mechanism may also be incorporated into the ends of strap portion 12a in order to more securely attach wearable electronic device 10a to a user's person. In one or more embodiments, a pair of magnet stays having opposite polarity may be placed in first and second ends $12a_{END1}$ and $12a_{END2}$ of strap portion 12a to more firmly secure the ends of strap portion 12a together. The pulling force of the magnet stays may be varied based the diameter chosen for second SMA wire 16a(2), which may be used to open wearable electronic device 10a. In one or more embodiments, electronic latching mechanisms may be incorporated into the ends of wearable electronic device 10a that can be controlled using logic that can be configured in wearable electronic device 10a to latch and unlatch an electronic latching mechanism in concert with opening and closing wearable electronic device 10a. These examples are only a few of the many means and methods that can be used to determine when and to which SMA wires to apply a current. Virtually any other means and methods can be used, and, thus, are clearly within the scope of the present disclosure.

In one or more embodiments, strap portion 12a may be made of one or more flexible materials including but not limited to, polymers, plastics, neoprene, rubbers, elastics, elastomers, silicone, polycarbonates, vinyl, polypropylene, polystyrene, polyethylene, combinations thereof or the like. In one or more embodiments, strap portion 12a may be covered by a covering, which can be made of natural fabrics, synthetic fabrics, fibers and blends thereof (e.g., cotton, polyester, nylon, satin, silk, wool, leather, etc.), polymers, plastics, neoprene, rubbers, elastics, elastomers, silicone, polycarbonates, vinyl, polypropylene, polystyrene, polyethylene, combinations thereof or the like. In one or more embodiments, strap portion 12a could have a hinged clamshell design. The covering may be used to insulate a user from any heat that may be generated by wearable electronic device 10a as it may be opened and/or closed.

In one or more embodiments, strap portion 12a may include multiple first SMA wires 16a(1) each having a default shape, which may correspond to the closed configuration of wearable electronic device 10a. In one or more embodiments strap portion 12a may include multiple second SMA wires 16a(2) each having a default shape, which may correspond to an opened configuration of wearable electronic device 10a. In various embodiments, incorporating multiple first and or second SMA wires into strap portion 12a of wearable electronic device 10a may improve the ability of wearable electronic device to maintain its closed configuration or may improve the rate at which wearable electronic device can be attached or removed (e.g., opened or closed) from a user's person.

In one or more embodiments, electronics (e.g., processors, controllers, memory, logic, etc.) for wearable electronic device 10a may reside in strap portion 12a and/or input portion 14a. In one or more embodiments, wearable electronic device 10a may be configured to operate using a replaceable battery, or in some cases, may be configured to operate using a rechargeable battery, each of which may be housed in strap portion 12a. In some embodiments, wearable electronic device may include charging contacts configured on either the outer or inner surface of strap portion 12a, which can be used in combination with a charging device to facilitate charging a rechargeable battery within wearable electronic device 10a. Virtually any means may be used to provide power and/or charging for wearable electronic device 10a, and, thus, are clearly within the scope of the present disclosure.

In one or more embodiments, wearable electronic device 10a can include wireless communication circuitry (e.g., Wi-Fi module, Bluetooth™ module, near field communication (NFC) module, or other wireless communication circuitry) to allow wearable electronic device 10a to communicate with one or more other electronic devices (wearable or not wearable) and/or a network through a wireless connection. The wireless connection may be any 3G/4G/LTE cellular wireless connection, WiFi/WiMAX connection, Bluetooth™ connection, or some other similar wireless connection. In an embodiment, a plurality of antennas can be provisioned in conjunction with wearable electronic device 10a, which may be associated with wireless connection activities. In one or more embodiments, wearable electronic device 10a may contain a camera, a microphone, and/or a speaker.

Figure 1B:
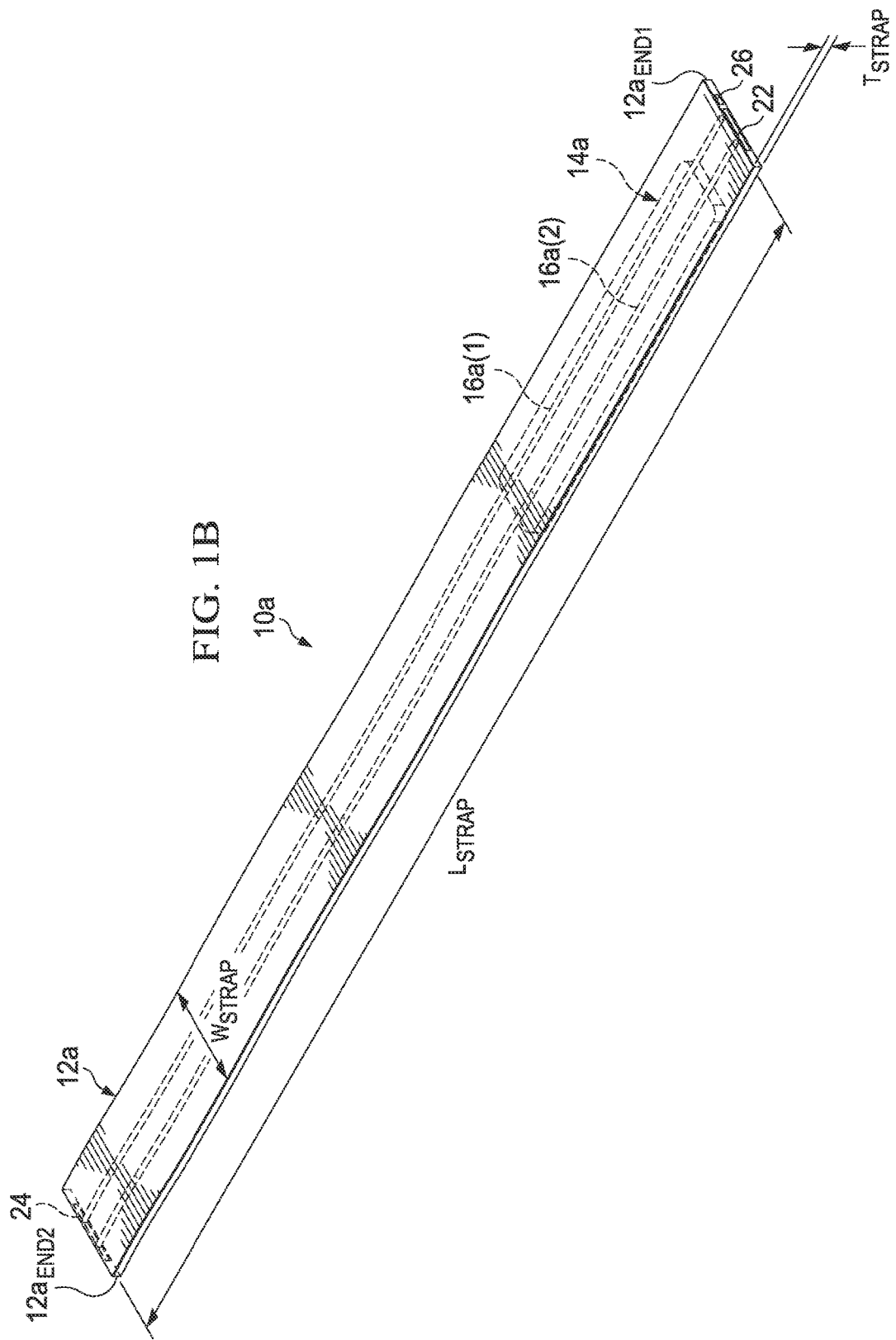
FIG. 1B is a simplified orthographic view illustrating an embodiment of a wearable electronic device, in accordance with one embodiment of the present disclosure.

Turning to FIG. 1B, FIG. 1B is a simplified orthographic view illustrating an embodiment of wearable electronic device 10a in accordance with one embodiment of the present disclosure. Wearable electronic device 10a can include strap portion 12a, which may include input portion 14a, first SMA wire 16a(1) and second SMA wire 16a(2). Wearable electronic device 10a, as shown in FIG. 1B, is in an open configuration.

In one or more embodiments, strap portion 12a may include a first magnet stay 22 in the first end $12a_{END1}$ and a second magnet stay 24 in the second end $12a_{END2}$ having an opposite polarity of first magnet stay 22. First and second magnet stays 22, 24 may provide a latching mechanism to secure the first and second ends $12a_{END1}$, $12a_{END2}$ of strap portion 12a together when in the default closed shape. The magnetic latching mechanism shown in FIG. 1B is only one example means for securing the ends of strap portion 12a together. Virtually any other latching means and methods could be used and, thus, are clearly within the scope of the present disclosure.

In one or more embodiments, strap portion 12a may further include a proximity sensor 26 configured in one end of strap portion 12a, which may be used to detect when the ends of strap portion 12a may be in contact using either an inductive or a magnetic proximity sensor. Proximity sensor 26 may be connected to logic within strap portion 12a that may control the application of current to first SMA wire 16a(1) and second SMA wire 16a(2). By detecting when the ends of strap portion 12a may be in contact with each other, proximity sensor 26 may signal to the logic to apply current to a particular SMA wire based on whether wearable electronic device is in a closed or open configuration in order to open or close wearable electronic device 10a accordingly. Although proximity sensor 26 is shown in FIG. 1B as being contained within first end $12a_{END1}$ of strap portion 12a, it should be understood that it could be contained in either end within the scope of the present disclosure.

Note that proximity sensor 26 is not necessary for operation of wearable electronic device 10a. In one or more embodiments, as discussed above, opening or closing wearable electronic device could be initiated based on inputs registered by input element 20a. In one example, a user may swipe input element 20a in a first direction to initiate closing wearable electronic device 10a and may swipe input element 20a in a second direction to initiate opening wearable electronic device 10a. In other embodiments, control logic within wearable electronic device 10a, may determine which SMA wire was manipulated last, and may apply current to a different wire based on the determination. In one or more embodiments, wearable electronic device 10a could include one or more one or more pairs of resistive strain gauges or pressure sensors that could be used by formable material control logic in the device to determine whether the device was in an opened or closed configuration and accordingly apply a current to a corresponding SMA wire to open or close the device.

As shown in FIG. 1B, strap portion 12a may have a length $L_{STRAP}$, which may range from approximately 5 inches to approximately 10 inches. Strap portion 12a may have a width $W_{STRAP}$, which may range from approximately 8 mm to approximately 65 mm. Strap portion 12a may have a thickness $T_{STRAP}$, which may range from approximately 3 mm to approximately 40 mm. In more general terms, strap portion 12a can be constructed having varying overall lengths to accommodate securing wearable electronic device 10a to a variety of different users, which may have a range of different body proportions, etc. and/or a variety of different user body parts (e.g., wrists, arms, ankles, etc.) which may have a range of different corresponding sizes. The ornamental design and material construction of strap portion 12a can be adjusted in any manner to suit any designer, manufacturer and/or vendor without departing from the scope of the embodiments described in the present disclosure.

Turning to FIG. 1C, FIG. 1C is a simplified orthographic view illustrating an embodiment of wearable electronic device 10a in accordance with one embodiment of the present disclosure. Wearable electronic device 10a can include strap portion 12a, which may include first SMA wire 16a(1) having a default curved shape corresponding to the closed configuration of wearable electronic device 10a, second SMA wire 16a(2) having a default flat shape corresponding to the opened configuration of wearable electronic device 10a, input portion 14a and input element 20a, which may be configured as a touch input element. In one embodiment, to attach wearable electronic device 10a to a user's wrist 30, wearable electronic device 10a can be rested on the user's wrist 30. Note that the example as shown in FIG. 1C is provided for illustrative purposes only to illustrate various features and elements of wearable electronic device 10a. In other cases, wearable electronic device 10a could also be laid on a surface to attach it to the user's wrist 30. Note also that although strap portion 12a is shown in a flat shape in FIG. 1C, it should be understood that wearable electronic device 10a may attached to a user from any shape of strap portion 12a.

In one or more embodiments, the user may provide a touch input, using a finger 32, to input element 20a to initiate attaching wearable electronic device 10a around the user's wrist 30. Input element 20a may register the touch input and input control logic in wearable electronic device 10a (which may be in communication with other touch input circuitry) may output input data (e.g., touch input data) corresponding to the touch. In an embodiment, shape memory control logic in wearable electronic device 10a may receive the input data and may determine, based at least in part on the input data, to apply a current to first SMA wire 16a(1) in strap portion 12a. The current may be used to manipulate or reset first SMA wire 16a(1) from its deformed shape back to its default curved shape, thereby pulling the ends of strap portion 12a together around the user's wrist 30, which may attach wearable electronic device 10a to the user's wrist 30.

In one or more embodiments, the user's touch may be a swipe across input element 20a in a first direction, say, for example, from left to right in order to initiate closing wearable electronic device around the user's wrist 30. In such embodiments, shape memory control logic in wearable electronic device 10a may determine, based, at least in part on the swipe, to apply a current to first SMA wire 16a(1) based on the direction of the swipe, which may cause SMA wire 16a(1) to begin to re-shape back to its curved default shape. As noted above, virtually any other touches, gestures, interactions, voice commands, etc. could be used to initiate attaching wearable electronic device 10a to a user, and, thus, are clearly within the scope of the present disclosure. In one or more embodiments, voice commands could be registered with the device such as, for example, "Open" or "Close", which could subsequently be provided to a voice input element to initiate, respectively, opening or closing wearable electronic device 10a. In one or more embodiments, initiation could be controlled from another electronic device, which may communicate with wearable electronic device 10a through wireless communication circuitry contained therein.

In one or more embodiments, shape memory control logic in wearable electronic device 10a may also determine whether wearable electronic device 10a is in an opened configuration based on proximity sensor data that may be received (or not received) from proximity sensor control logic that may also be configured in an end of strap portion 12a. In such embodiments, the user may provide an input (e.g., touch, gesture, etc.) to input element 20a. Following the user input, shape memory control logic in wearable electronic device 10a may determine that the device is in the opened configuration and may apply a current to first SMA wire 16a(1) in order to manipulate SMA wire 16a(1) from its deformed shape back to its default flat shape. In various embodiments, the determining could be performed before or after a user input, for example, wearable electronic device 10a may store whether it is in the open or closed configuration by tracking opening and closing operations. The examples described above are only a few of the many other means and methods that could be used to attach wearable electronic device 10a to a user using a shape memory material as discussed herein. Virtually any other means and methods could be used and, thus, are clearly within the scope of the present disclosure.

Figure 1D:
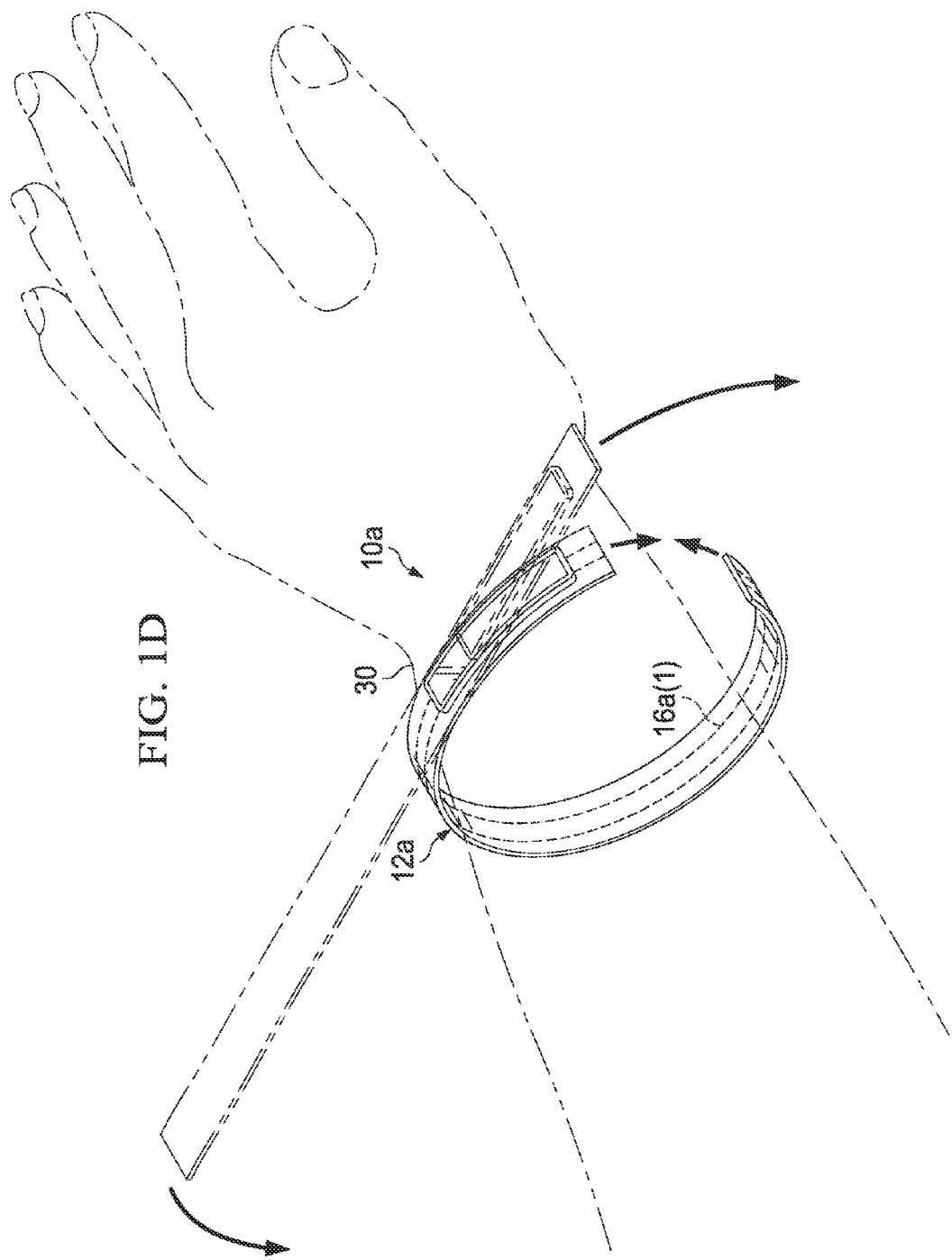
FIG. 1D is a simplified orthographic view illustrating an embodiment of a wearable electronic device, in accordance with one embodiment of the present disclosure.

FIG. 1D is a simplified orthographic view illustrating wearable electronic device 10a following the application of current to first SMA wire 16a(1) in accordance with one embodiment of the present disclosure. As first SMA wire 16a(1) is reset to its default curved shape, it may pull the ends of strap portion 12a together, which may attach wearable electronic device to the user's wrist 30.

FIG. 1E is a simplified orthographic view illustrating wearable electronic device 10a after first SMA wire 16a(1) has been reset back to its default curved shape. Wearable electronic device 10a is attached to the user's wrist 30 following the manipulation of SMA wire 16a(1) back to its default curved shape. As discussed above, the ends of strap portion 12a may be held in contact with each other by first SMA wire 16a(1), which may retain its default shape corresponding to the closed configuration even after current is removed from the wire and by second SMA wire 16a(2), which may hold its deformed shape until a current is applied to it in order to open wearable electronic device 10a. In one or more embodiments, latching mechanisms, such as for example, magnet stays, may also be incorporated into the ends of strap portion 12a in order to more securely attach wearable electronic device to the user's wrist 30.

The current may be removed from first SMA wire 16a(1) after wearable electronic device 10a is attached to the user's wrist 30. In one or more embodiments, a proximity sensor (e.g., proximity sensor 26) can be used to detect when the ends of strap portion 12a may be in contact with each other. Based on proximity sensor data received from the proximity sensor and/or associated proximity sensor logic when the ends of strap portion 12a are in contact with each other, shape memory control logic in wearable electronic device 10a may remove or deactivate the current from first SMA wire 16a(1). In another embodiment, shape memory control logic in wearable electronic device 10a can remove or deactivate the current from first SMA wire 16a(1) after a predetermined period of time. In one or more embodiments, the predetermined period of time may be within an approximate range of 1 s to 10 s, although other times are certainly encompassed by alternative embodiments of the present disclosure. The predetermined period of time should be sufficient to allow first SMA wire 16a(1) to reset back to its default shape but not overheat the wire, which may damage strap portion 12a, first SMA wire 16a(1) or any electronics within wearable electronic device 10a. In one or more embodiments, the predetermined period of time may be adjusted based on the amount of current applied to first SMA wire 16a(1), the number of first SMA wires used in strap portion 12a (e.g., more than one first SMA wire may be used) and/or any other variable related to the construction of wearable electronic device 10a, including but not limited to, the alloy, thickness, diameter, length, shape, etc. of first SMA wire 16a(1).

Figure 1F:
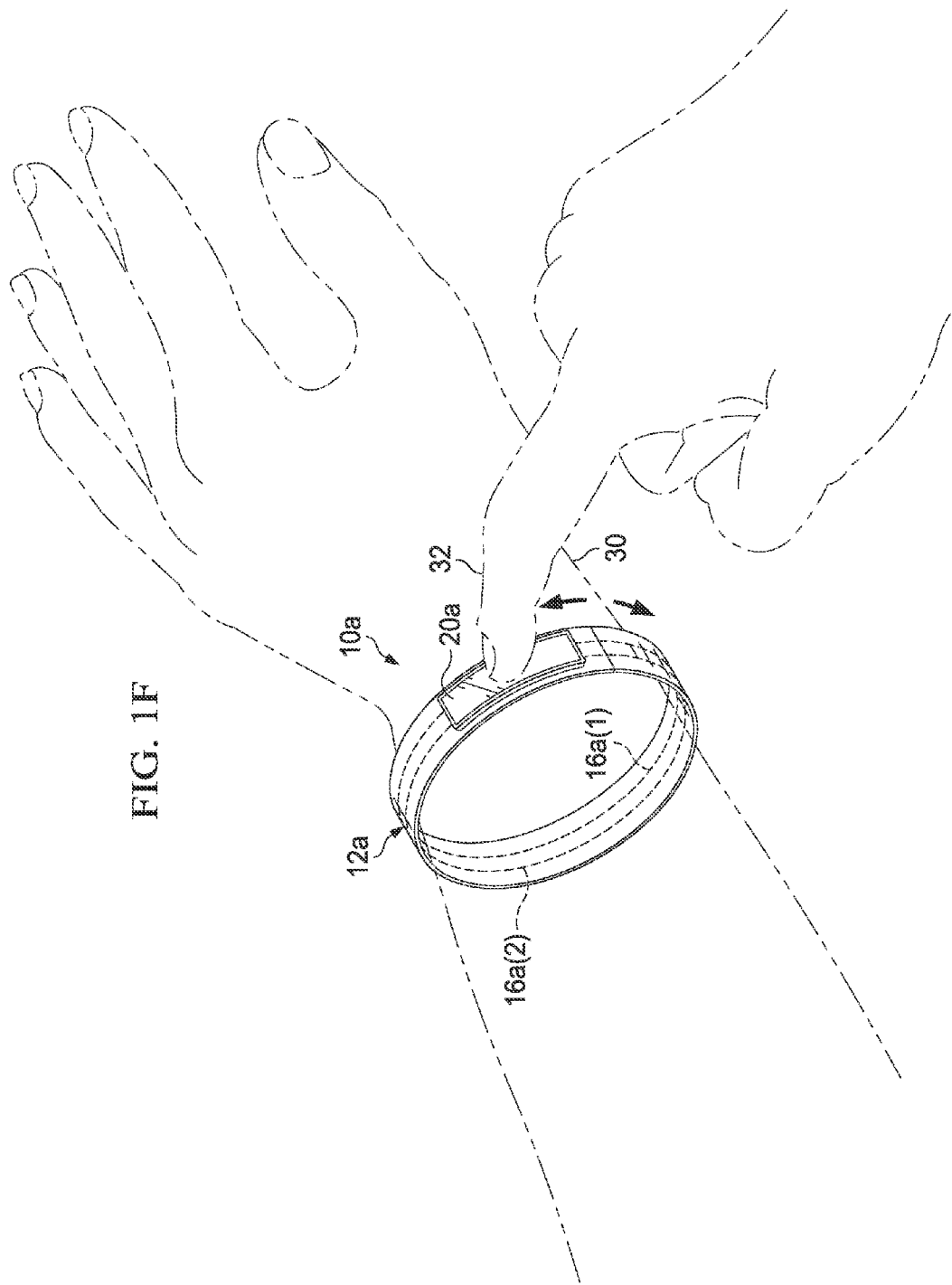
FIG. 1F is a simplified orthographic view illustrating an embodiment of a wearable electronic device, in accordance with one embodiment of the present disclosure.

Turning to FIG. 1F, FIG. 1F illustrates an embodiment of wearable electronic device 10a in the closed configuration around the user's wrist 30 in accordance with one embodiment of the present disclosure. In an embodiment, wearable electronic device 10a can be removed from the user's wrist 30 by the user touching input element 20a with the user's finger 32 to initiate opening wearable electronic device 10a. In an embodiment, input element 20a may register the touch and input control logic may output input data corresponding to the touch. In an embodiment, shape memory control logic in wearable electronic device 10a may receive the input data and may determine, based at least in part on the input data, to apply a current to second SMA wire 16a(2). The current may be used to manipulate or reset second SMA wire 16a(2) from its deformed shape (e.g., curved around the user's wrist 30) back to its default flat shape, which may pull the ends of strap portion 12b apart to allow the user to remove their wrist 30 from the device.

Note, again, that in various embodiments the touch can be any of a tap, multiple taps, a swipe, say for example a swipe from right to left (e.g., opposite the swipe discussed above for closing wearable electronic device 10a to the user's wrist), combinations thereof, or could be gestures, voice commands, combinations thereof or the like. Further, in some embodiments, shape memory control logic in wearable electronic device 10a may determine that the device is in a closed configuration based proximity sensor data for a proximity sensor, which may be configured in an end of wearable electronic device 10a. In such embodiments, the user may provide inputs to input element 20a (e.g., touch, gesture, etc.). In an embodiment, shape memory control logic in wearable electronic device 10a may determine (e.g., before or after the inputs) that the device is in the closed configuration and may apply a current to second SMA wire 16a(2) in order to manipulate or reset SMA wire 16a(2) from its deformed shape back to its default flat shape.

FIG. 1G illustrates wearable electronic device 10a following the application of the current to second SMA wire 16a(2) after it has been reset to its default flat shape, thereby placing wearable electronic device 10a in an opened configuration in accordance with one embodiment of the present disclosure. First SMA wire 16a(1) may be in a deformed shape in FIG. 1G. The user may freely remove their wrist 30 from wearable electronic device 10a, as shown in FIG. 1G.

The current may be removed from second SMA wire 16a(2) after wearable electronic device 10a is placed in its open configuration. As described above, various means and methods may be used to remove or deactivate the current from second SMA wire 16a(2), which can include, but not be limited to, determining whether the ends of strap portion 12a are not in contact with each other using a proximity sensor, removing or deactivating the current after a predetermined period of time, combinations thereof or the like. In one or more embodiments, the predetermined period of time may be within an approximate range of 1 s to 10 s, although other times are certainly encompassed by alternative embodiments of the present disclosure. The predetermined period of time should be sufficient to allow second SMA wire 16a(2) to reset back to its default shape but not overheat the wire, which may damage strap portion 12a, second SMA wire 16a(2) or any electronics within wearable electronic device 10a. Additionally, in one or more embodiments, the predetermined period of time may be adjusted based on the amount of current applied to second SMA wire 16a(2), the number of second SMA wires used in strap portion 12c (e.g., more than one second SMA wire may be used) and/or any other variable related to the construction of wearable electronic device 10a including but not limited to, the alloy, thickness, diameter, length, shape, etc. of second SMA wire 16a(2). For any alternative embodiments including one or more SMA wires in one or more strap portions, the predetermined period of time may be adjusted in a similar manner.

In general terms, wearable electronic device 10a can be attached to a user (e.g., the user's wrist, arm, ankle, etc.) and detached from the user by manipulating one or more SMA wires that may be contained within strap portion 12a. A user may provide inputs to an input element contained in wearable electronic device to initiate attaching and detaching wearable electronic device 10a. Through selective application of current to one or more first SMA wires 16a(1) (recall, multiple first and second SMA wires can be configured in wearable electronic device 10a), wearable electronic device 10a can be attached to the user as one or more first SMA wires 16a(1) are reset back to a default curved shape, which may correspond to a closed configuration for wearable electronic device 10a. Through selective application of current to one or more second SMA wires 16a(2), wearable electronic device can be removed from the user as second SMA wires 16a(2) are reset to a default flat shape, which may correspond to an open configuration for wearable electronic device 10a.

For purposes of illustrating certain example features of electronic device 10a the following foundational information may be viewed as a basis from which the present disclosure may be properly explained. Wearable electronic devices often require physical exertion by a user to attach and remove the device from the user's person (e.g., wrist, arm, ankle, etc.). To attach such devices, the user is typically required to wrap straps for the device around a body part, say, a wrist, bring together two opposing ends of the strap, and attach the ends in some manner, typically through use of a buckle. This sequence of wrapping, bringing together and attaching can be time consuming and may cause some users frustration, discomfort and/or inefficiencies in attempting and re-attempting (e.g., for failed first attempts) to attach the device to their person. Further, to remove the device, the user will have to perform the same steps in reverse, which, again can be time consuming to the user.

In at least one example embodiment, wearable electronic device 10a may include one or first SMA wires 16a(1) in strap portion 12a. The one or more first SMA wires 16a(1) may have a default curved shape that may correspond to a closed configuration of the wearable electronic device. A current can be applied to the one or more first SMA wires 16a(1) to pull ends of strap portion 12a together, thereby attaching wearable electronic device 10a to a user. One or more second SMA wires 16a(2) may also be included in the strap portion. The one or more second SMA wires 16a(2) may have a default flat shape that corresponds to an opened configuration of wearable electronic device 10a. A current can be applied to the one or more second SMA wires 16a(2) to pull ends strap portion 12a apart, thereby allowing a user to remove wearable electronic device 10a.

A user can initiate opening and closing wearable electronic device 10a through minimal interaction. In at least one example embodiment, the user may touch an input element 20a configured on an outer surface of a strap portion with a finger to initiate attaching and/or removing wearable electronic device 10a from the user's person. In at least one other example embodiment, the user may bring a first input element configured on an inner surface of a strap portion in contact with the user's person to initiate attaching a wearable electronic device to the user's person. The user may then provide an input to a second input element configured on an outer surface of the strap portion to initiate removing the wearable electronic device from the user's person. In other embodiments, a user may perform gestures, voice commands or other interactions, which may be registered by the input element, which may include an optical sensor, to initiate attaching and removing a wearable electronic device. In other embodiments, opening and closing a wearable electronic device may be initiated from another device, which may communicate opening and/or closing commands to the wireless electronic device via wireless communication circuitry that may be contained in the device.

Particular embodiments described herein provide for a wearable electronic device such as an electronic bracelet, watch, wristband, armband, anklet, etc. that includes a circuit board coupled to a plurality of electronic components (which includes any type of components, elements, circuitry, etc.). In certain embodiments, the circuit board may be a flexible printed circuit board. The wearable electronic device may further include a shape memory material, such as an SMA, that may be configured as one or more SMA wires in a strap portion of the wearable electronic device. The SMA wires may provide a means for both attaching the wearable electronic device to a user and for removing the wearable electronic device from the user. Few steps may be required by the user to attach and remove the wearable electronic device from the user's person. In one or more embodiments, inputs (e.g., touches, gestures, voice commands, other interactions, etc.) provided by the user to one or more input elements configured on the wearable electronic device may be used to initiate attaching and/or removing the wearable electronic device from the user's person.

In at least one example embodiment, the circuit board of wearable electronic device 10a is a general circuit board that can hold various components of an internal electronic system of wearable electronic device 10a. The components may include a central processing unit (CPU), a memory, etc. More specifically, the circuit board can provide the electrical connections by which the other components of the system can communicate.

Any processors (inclusive of digital signal processors, microprocessors, supporting platform hardware, etc.), memory elements, etc. can be suitably coupled to the circuit board based on particular configuration need, processing demands, electronic device designs, etc. Note that particular embodiments of the present disclosure may readily include a system on chip (SOC) central processing unit (CPU) package. An SOC represents an integrated circuit (IC) that integrates components of a computer or other electronic system into a single chip. The chip may contain digital, analog, mixed-signal, and often radio frequency functions: all of which may be provided on a single chip substrate.

Note also that particular embodiments of the present disclosure may include logic that can be implemented in a variety of manners. For example, logic can be implemented in software, which may mean that a processor may be instructed to detect inputs to an input element, to determine input data from the inputs and to manipulate a shape memory material contained in one or more strap portions of a wearable electronic device based on the input data, etc. In another example, logic can be implemented in firmware that a separate device may utilize. In yet another example, logic can be implemented as a standalone hardware chip controller.

Turning to FIG. 2A, FIG. 2A is a simplified orthographic view illustrating an embodiment of a wearable electronic device 10b in accordance with one embodiment of the present disclosure. Wearable electronic device 10b can include a strap portion 12b, which can include a first input portion 14b(1) including a first input element 20b(1) configured about an outer surface of strap portion 12b and a second input portion 14b(2) including a second input element 20b(2) configured about an inner surface of strap portion 12b. Strap portion 12b may further include a first SMA wire 16b(1), which may have a default curved shape corresponding to a closed configuration for wearable electronic device 10b, and a second SMA wire 16b(1), which may have a default flat shape corresponding to an opened configuration for wearable electronic device 10b. Wearable electronic device 10b is shown in the closed configuration in FIG. 2A with a first end $12b_{END1}$ and a second end $12b_{END2}$ of strap portion 12b in contact with each other. In one or more embodiments, first and second input portions may be contained within/on and/or supported by strap portion 12b.

Wearable electronic device 10b may be similar to wearable electronic device 10a, except that wearable electronic device 10b may include second input portion 14b(2) including second input element 20b(2), which may be configured about the inner surface of strap portion 12b in addition to first input portion 14b(1) including first input element 20b(1) configured about the outer surface of strap portion 12b. As discussed in further detail below, second input element 20b(2) may streamline processes for attaching wearable electronic device 10b to a user by allowing the user to simply place a body part (e.g., wrist, arm, ankle) in contact with (e.g., for touches) or near (e.g., for motions) second input element 20b(2) to initiate attaching wearable electronic device 10b to the user.

Turning to FIG. 2B, FIG. 2B is a simplified orthographic view illustrating an embodiment of wearable electronic device 10b in accordance with one embodiment of the present disclosure. Wearable electronic device 10b can include strap portion 12c, first input portion 14b(1) including first input element 20b(1) (not shown), second input portion 14b(2) including second input element 20b(2), first SMA wire 16b(1) and second SMA wire 16b(2). Wearable electronic device 10b is in an open configuration with the outer surface of strap portion 12b facing downward and the outer surface facing upward. FIG. 2B illustrates an example of a user placing their wrist 34 on second input element 20b(2) to initiate attaching wearable electronic device 10b to the user's wrist 34.

In an embodiment, wearable electronic device 10b may include input control logic configured to distinguish inputs for either first input element 20b(1) or second input element 20b(2) and output input data corresponding to which input element a user may be interacting with (e.g., providing inputs to); for example, second input element 20b(2), as shown in FIG. 2B. For the present example, input control logic in wearable electronic device 10b may output input data corresponding to the user's interaction with second input element 20b(2). In an embodiment, based, at least in part on the input data, shape memory control logic in wearable electronic device may determine to apply a current to first SMA wire 16b(1) in order to attach wearable electronic device 10b to the user (e.g. manipulate or reset first SMA wire 16b(1) back to its default curved shape). In various embodiments, proximity sensor data for a proximity sensor or other like device may also be used by shape memory control logic in wearable electronic device 10b in combination with input data to determine to which SMA wire(s) to apply a current based on whether wearable electronic device 10b may be in an opened or closed configuration. The examples described above are only a few of the many other means and methods that could be used to attach wearable electronic device 10b to a user using a shape memory material as discussed herein. Virtually any other means and methods could be used and, thus, are clearly within the scope of the present disclosure.

FIG. 2C is a simplified orthographic view illustrating wearable electronic device 10b following the application of current to first SMA wire 16b(1) in accordance with one embodiment of the present disclosure. As first SMA wire 16b(1) is manipulated or reset back to it default curved shape, it may pull the ends of strap portion 12b together around the user's wrist 34, which may attach wearable electronic device 10b to the user's wrist 34.

FIG. 2D is a simplified orthographic view illustrating wearable electronic device 10b after first SMA wire 16b(1)

has been reset back to its default curved shape in accordance with one embodiment of the present disclosure. Wearable electronic device 10b is attached to the user's wrist 34 following the manipulation of first SMA wire 16b(1) back to its default curved shape. As discussed above, the ends of strap portion 12b may be held in contact with each other by first SMA wire 16b(1), which may retain its default shape corresponding to the closed configuration even after current is removed from the wire and by second SMA wire 16b(2), which may hold its deformed shape until a current is applied to it in order to open wearable electronic device 10a. In one or more embodiments, latching mechanisms, such as for example, magnet stays, may also be incorporated into the ends of strap portion 12b in order to more securely attach wearable electronic device to the user's wrist 34. The current may be removed from first SMA wire 16b(1) after wearable electronic device 10c is placed in its closed configuration using various means and methods as described above.

Turning to FIG. 2E, FIG. 2E illustrates an embodiment of wearable electronic device 10b in the closed configuration around the user's wrist 34. In the example embodiment shown in FIG. 2E, wearable electronic device 10b can be removed from the user's wrist 34 by the user providing a touch input to first input element 20b(1) with the user's finger 36 to initiate opening wearable electronic device 10b. In an embodiment, first input element 20b(1) may register the touch input and input control logic may output input data (e.g., touch input data) corresponding to the touch input. In an embodiment, shape memory control logic in wearable electronic device 10a may receive the input data and may determine, based at least in part on the input data to apply a current to second SMA wire 16b(2). The current may be used to manipulate or reset second SMA wire 16b(2) from its deformed shape (e.g., curved around the user's wrist 34) back to its default flat shape, which may pull the ends of strap portion 12b apart to allow the user to remove their wrist 34 from the device.

FIG. 2F illustrates wearable electronic device 10a following the application of the current to second SMA wire 16b(2) after it has been reset back to its default flat shape, thereby placing wearable electronic device 10b in an opened configuration. First SMA wire 16bb(1) may be in a deformed shape in FIG. 2F. The user may freely remove their wrist 34 from wearable electronic device 10b, as shown in FIG. 2F. The current may be removed from second SMA wire 16b(2) after wearable electronic device 10c is placed in its open configuration using various means and methods as described above.

Turning to FIG. 3A, FIG. 3A is a simplified orthographic view illustrating an embodiment of a wearable electronic device 10c in accordance with one embodiment of the present disclosure. Wearable electronic device 10c can include a shape memory polymer (SMP) strap portion 12c that can be made of an SMP, an input portion 14c, including an input element 20c and a heating device 18c. SMP strap portion 12c may have an outer surface and an inner surface. Wearable electronic device 10c, as shown in FIG. 3A is in a closed configuration having a pair of opposing ends, $12c_{END1}$ and $12c_{END2}$ of SMP strap portion 12c in contact with each other.

Wearable electronic device 10c is different than wearable electronic devices 10a and 10b in that wearable electronic device 10c in several respects. First, SMP strap portion 12c may be made of an SMP, rather than including SMA wires. Second, wearable electronic device 10c can only be operated to attach to a user's person (e.g., wrist, arm, ankle, etc.) through the application of heat to SMP strap portion 12c, which may cause it to pull its ends together around the user's person. The user will then need to pull the ends of SMP strap portion 12c apart in order to remove wearable electronic device 10c from their person. However, given the physical properties of SMPs, described below, wearable electronic device 10c can easily be reattached to the user with minimal interaction by the user.

In general, SMPs are polymeric materials that can be reset from a deformed shape back to a default shape by heating the SMP to a temperature near or greater than its glass transition temperature. An SMP can also hold a deformed shape until it is reset back to its default shape. SMPs are also capable of being deformed by both bending and stretching actions. A default shape for SMP strap portion 12c may be 'set' by heating SMP strap portion 12c above its glass transition temperature to a formation temperature, which will be higher than the glass transition temperature, and setting the desired shape for SMP strap portion 12c at or above its formation temperature.

In one or more embodiments an SMP strap portion 12c can be configured to have a glass transition temperature ranging from approximately 30° (86° F.) to approximately 55° C. (131° F.), although other temperatures are certainly encompassed by alternative embodiments of the present disclosure. In one or more embodiments, SMP strap portion 12c can be made of both thermoplastic and thermoset polymeric materials. In one or more embodiments, SMP strap portion 12c can be made electroactive by including metallic nickel powder or short carbon fibers in the polymeric materials. A current may be applied to the SMP strap portion to cause it to heat and reset from a deformed shape to its default shape. Embodiments discussed herein with regard to SMP strap portions illustrate a heating device (e.g., heating device 18a being encapsulated in an SMP strap portion and applying a current to the heating device, which may cause a respective SMP strap portion to be heated and thus reset back to its respective default shape. However, electroactive SMP strap portions are certainly encompassed by alternative embodiments of the present disclosure.

SMP strap portion 12c, as shown in FIG. 3A, may be set to have a default curved shape that may correspond to the closed configuration of wearable electronic device 10c. SMP strap portion 12c can be reset from a deformed shape (e.g., a shape that may result from removing wearable electronic device 10c from a user) back to its default curved shape when heat from heating device 18 may be applied to SMP strap portion 12c thereby causing it to be heated to a temperature near or above its configured glass transition temperature and causing it to reset back to its default shape. Resetting SMP strap portion 12c back to its default curved shape may pull the ends of SMP strap portion 12c together, thereby attaching wearable electronic device 10c to a user's person.

In the closed configuration, first and second ends $12c_{END1}$ and $12c_{END2}$ of SMP strap portion 12c may be held in contact with each other by the SMP that may be used to make SMP strap portion 12c. SMP strap portion 12c may retain its default curved shape corresponding to the closed configuration of wearable electronic device 10c after heat from heating device 18 may be removed (e.g., removing current from heating device 18).

In one or more embodiments, a latching mechanism may also be incorporated into the ends of SMP strap portion 12c in order to more securely attach wearable electronic device 10a to a user's person. In one or more embodiments, SMP strap portion 12c may include magnet stays configured in its first and second ends $12c_{END1}$ and $12c_{END2}$ to provide a latching mechanism to secure of strap portion 12c together when in the default curved shape. A magnetic latching mechanism is only one example means for securing the ends of SMP strap portion 12c together. In other embodiments, electronic latching mechanisms may be incorporated into the ends of wearable electronic device 10c, which can be controlled using logic that can be configured in wearable electronic device 10c to latch and unlatch an electronic latching mechanism in concert with opening and closing wearable electronic device 10c. Virtually any other latching means and methods could be used and, thus, are clearly within the scope of the present disclosure.

In one or more embodiments, SMP strap portion 12c can be covered by one or more flexible materials, which may allow strap portion to bend and flex freely, but which may also provide an insulating layer between strap portion 12c and a user. For example, in one or more embodiments, strap portion 12c may be covered by natural fabrics, synthetic fabrics, fibers and blends thereof (e.g., cotton, polyester, nylon, satin, silk, wool, leather, etc.), polymers, rubbers, elastics, neoprene, elastomers, silicone, polycarbonates, vinyl, polypropylene, polystyrene, polyethylene, combinations thereof or the like. The ornamental design of strap portion 12c can be adjusted in any manner to suit any designer, manufacturer and/or vendor without departing from the scope of the embodiments described in the present disclosure.

In one or more embodiments, input portion 12c and input element 20c may be made of flexible materials to bend with SMP strap portion 12c. In one or more embodiments, input element 20c can be a touchscreen such as a capacitive or a resistive touchscreen to register one or more touch inputs. In one or more embodiments, input element 20c may also be capable of registering one or more interactions, gestures or the like performed near input element 20c through use of an optical sensor and associated gesture recognition circuitry, logic, etc. which can be included in input portion 14c, in order to control closing operations for wearable electronic device 10c. In one or more embodiments, input element 20c can include a microphone to receive voice inputs that could be coupled to appropriate circuitry, voice recognition logic, etc., which can be included in input portion 14c, in order to control opening and closing operations for wearable electronic device 10a.

Although input portion 14c is illustrated in FIG. 3A as being placed on the outer surface of SMP strap portion 12c, it could also be contained beneath the outer surface, which may conceal input portion 14c. In one or more embodiments, input portion 14c may include a display screen such as an OLED display screen, transparent OLED display screen or any other suitable display screen system, which may allow a user to interact with features and applications of wearable electronic device 10c. The display screen may be flexible to bend with SMP strap portion 12c.

In one or more embodiments, heating device 18c may be a wire, insulated wire, resistive device, combination of resistive devices, heating element (e.g., metal, ceramic, composite, etc.) combinations thereof or the like, which may be configured in SMP strap portion 12c. In one or more embodiments, heating device 18c may generate heat from current applied from a current source (e.g., battery, capacitor, circuitry, etc.) in wearable electronic device 10c. In one or more embodiments, heat generated by heating device 18c may heat SMP strap portion 12c to a temperature near or above its glass transition temperature to facilitate manipulating SMP strap portion from a deformed shape back to its default shape.

Heating device 18c, as shown in FIG. 3A, is illustrated as 'snaking' through SMP strap portion 12c for illustrative purposes only. It should be understood that heating device 18 may be placed in SMP strap portion 12c in any configuration. In one or more embodiments, different configurations may be determined based on different technologies that may be used to implement heating device 18c, which may help to displace heat throughout SMP strap portion 12c. In one or more embodiments, multiple heating devices may be configured in SMP strap portion 12c. These example means and methods for heating SMP strap portion 12c are only a few of the many means and methods that could be used to heat SMP strap portion 12c. Virtually any other means and methods could be used and, thus, are clearly within the scope of the present disclosure.

Turning to FIG. 3B, FIG. 3B is a simplified orthographic view illustrating an embodiment of wearable electronic device 10c in accordance with one embodiment of the present disclosure. As shown in FIG. 3B, wearable electronic device 10c can include SMP strap portion 12c, input portion 14c, including input element 20c, and heating device 18c. SMP strap portion 12c may have a default curved shape corresponding to the closed configuration of wearable electronic device 10c. SMP strap portion 12c, as shown in FIG. 3B is in a deformed flat shape. Note that although SMP strap portion 12c is shown in a flat deformed shape in FIG. 3B, it should be understood that wearable electronic device 10c may attached to a user from any deformed shape of SMP strap portion 12c. Similar to the examples discussed above, the following examples for wearable electronic device 10c (and 12d and 12e) describe touch inputs for initiating various actions, however, it should be understood that motion and/or voice inputs could also be used in alternative embodiments of the present disclosure.

In one example embodiment, the user may provide a touch input, using a finger 44, to input element 20c to initiate attaching wearable electronic device 10c around the user's wrist 42. In an embodiment, input element 20c may register the touch input and input logic in wearable electronic device may output input data corresponding to the touch input. Shape Memory control logic in wearable electronic device 10a may receive the input data and may determine, based at least in part on the input data, to apply a current to heating device 18c within SMP strap portion 12c.

In various embodiments, the user's touch input could be a tap, multiple taps, swipe, etc. In various embodiments, input element 20c may also be capable of registering one or more interactions, gestures, voice commands or the like near input element 20c (e.g., using an optical sensor, microphone, etc. and associated circuitry, logic, etc.), which could also be used to initiate attaching wearable electronic device 10c. In various embodiments, proximity sensor data for a proximity sensor or other like device that may be configured in an end of SMP strap portion 12c may also be used by shape memory control logic in wearable electronic device 10c in combination with input data to determine to apply a current to heating device 18c in order to attach wearable electronic device 10c to a user. These examples are only a few of the many other means and methods that could be used to attach wearable electronic device 10c to a user using a shape memory material as discussed herein. Virtually any other means and methods could be used and, thus, are clearly within the scope of the present disclosure.

FIG. 3C is a simplified orthographic view illustrating an embodiment of wearable electronic 10c following the application of current to heating device 18c within SMP strap portion 12c in accordance with one embodiment of the present disclosure. As SMP strap portion 12c is manipulated or reset back to its default curved shape, it may pull its ends together around the user's wrist 42, which may attach wearable electronic device 10c to the user's wrist 42.

FIG. 3D is a simplified orthographic view illustrating an embodiment of wearable electronic device 10c attached to the user's wrist 42 with SMP strap portion 12c in its default curved shape in accordance with one embodiment of the present disclosure. Current may be removed from the heating device 18c after SMP strap portion 12c is manipulated or reset back to its default curved shape.

Various means and method may be used to remove or deactivate current from heating device 18c to avoid overheating SMP strap portion 12c once it has been reset back to its default curved shape. In one or more embodiments, wearable electronic device 10c can include a proximity sensor configured in either end of SMP strap portion 12c, which may detect when SMP strap portion 12c may be in its default curved shape with its ends in contract with each other. Based on proximity sensor data received from the proximity sensor (and/or logic associated with the proximity sensor) when the ends of SMP strap portion 12c are in contact with each other, shape memory control logic in wearable electronic device 10c may remove or deactivate the current from the heating device. In another embodiment, shape memory control logic in wearable electronic device 10c can remove or deactivate the current from the heating device after a predetermined period of time. In one or more embodiments, the predetermined period of time may be within an approximate range of 1 s to 10 s, although other times are certainly encompassed by alternative embodiments of the present disclosure. In other embodiments, combinations of both means and methods may be used. The predetermined period of time should be sufficient to allow first SMP strap portion 12c to reset back to its default shape but not overheat the heating device 18c and/or SMP strap portion 12c, which could damage strap portion 12c, heating device 18c or any electronics within wearable electronic device 10c. In one or more embodiments, the predetermined period of time may be adjusted based on the amount of current applied to heating device 18c, the number of heating devices used and/or the configuration of heating device 18c within SMP strap portion 12c and/or any other variable related to the construction of wearable electronic device 10c, including but not limited to, including but not limited to, the composition, thickness, diameter, length, shape, etc. of SMP strap portion 12c. For any alternative embodiments including one or more SMP strap portions, the predetermined period of time may be adjusted in a similar manner. These examples are only a few of the many means and methods that may be used to remove or deactivate current from the heating device. Virtually any other means and methods may be used, and, thus, are clearly within the scope of the present disclosure.

Turning to FIG. 4, FIG. 4 is a simplified orthographic view illustrating an embodiment of a wearable electronic device 10d in accordance with one embodiment of the present disclosure. Wearable electronic device 10d can include an SMP strap portion 12d, an input portion 14d, including an input element 20d, and a heating device 18d. Wearable electronic device 10d may be similar in all respects to wearable electronic device 10c, except that input portion 14d may be placed about the inner surface of SMP strap portion 12d.

Although input portion 14d as illustrated in FIG. 4 is shown as being placed on the inner surface of SMP strap portion 12d, it could also be contained beneath the inner surface, which may conceal input portion 14d. Placing input portion 14d about the inner surface of SMP strap portion 12d may provide additional conveniences for a user desiring to attach wearable electronic device 10d to the user's person (e.g., to a wrist, arm, ankle, etc.).

For example, a user may place their wrist (or arm, ankle, etc.) in contact with or near input element 20d (e.g., placing their wrist on or near input element 20d or placing wearable electronic device 10d on their wrist with input element 20d in contact with their wrist) in order to initiate attaching wearable electronic device 10d to their wrist with no further interaction from another finger, hand, body part, etc.

Turning to FIG. 5A, FIG. 5A is a simplified orthographic view illustrating an embodiment of a wearable electronic device 10e in accordance with one embodiment of the present disclosure. Wearable electronic device 10e may include multiple strap portions made of an SMP, a first SMP strap portion 12e(1), which may include a first heating device 18e(1), and a second SMP strap portion 12e(2), which may include a second heating device 18e(2). First SMP strap portion 12e(1) may further include an input portion 14e, which may include multiple input element segments, a first input element segment 20e(1) and a second input element segment 14e(2). First and second SMP strap portions 12e(1), 12e(2) may be coupled together using one or more coupling elements 50.

First and second SMP strap portions 12e(1), 12e(2) may each have their own default curved shape, which, in combination with any length that may be added by coupling elements 50, may give wearable electronic device 10e a default diameter $D_{DEFAULT}$. In various embodiments, the default diameter $D_{DEFAULT}$ of wearable electronic device 10e can be configured based on the overall length of wearable electronic device 10e, which can range from approximately 5 inches to approximately 10 inches in length, although other dimensions are certainly encompassed by alternative embodiments of the present disclosure. Similar to the dimensions discussed above, the dimensions of wearable electronic device 10e can be altered as determined by any designer and remain with the scope of the present disclosure.

Wearable electronic device 10e is different from wearable electronic devices 10a-10d in that wearable electronic device 10e does not open or close, but rather contains multiple strap portions (e.g., first and second SMP strap portions 12e(1), 12e(2)), which can be adjusted in size in order to attach and comfortably fit wearable electronic device 10e to a user. First and second SMP strap portions 12e(1), 12e(2) can include respective heating devices 18c(1), 18c(2), which can be used in combination with logic configured in wearable electronic device to reset respective, SMP strap portions 12e(1), 12e(2) from a deformed shape to each of their corresponding default shapes.

By having multiple SMP strap portions, wearable electronic device 10e can be sized according to the desires of a user to snuggly fit on the user's person (e.g., wrist, arm, ankle, etc.). Further, because each SMP strap portion 12e(1), 12e(2) may be made of an SMP, each portion can be deformed (e.g., stretched, bent, twisted, etc.) to have their own unique shape, which may be held until reset to their respective default shapes. Although two SMP strap portions are shown in FIG. 5A, it should be understood that any number of SMP strap portions can be configured for a wearable electronic device and, thus, are clearly within the scope of the present disclosure.

In or more embodiments, coupling elements 50 can be chains, cables, wire, fabrics (synthetic or natural), combinations thereof or the like. In one or more embodiments, coupling elements 50 may be covered by coverings 52, which can be made of natural fabrics, synthetic fabrics, fibers and blends thereof (e.g., cotton, polyester, nylon, satin, silk, wool, leather, etc.), polymers, rubbers, neoprene, elastics, elastomers, silicone, polycarbonates, vinyl, polypropylene, polystyrene, polyethylene, combinations thereof or the like. In one or more embodiments, the coverings can be made to extend around first and second SMP strap portions 12e(1), 12e(2).

Although not shown, in one or more embodiments, electrical interconnecting components (e.g., ribbon wire, braided wire, single conductor wire, cable, plug, housing, etc.) may be included in the area between first and second SMP strap portions 12e(1), 12e(2) to facilitate applying current to first and second heating devices 18e(1), 18e(2), respectively, from electronics contained in wearable electronic device 10e. In one or more embodiments, electrical interconnecting components may also be included as a part or parts of coupling elements 50. In one or more embodiments, electronics (e.g., processors, controllers, batteries, circuitry, etc.) for wearable electronic device 10e may reside in either first SMP strap portion 12e(1) or second SMP strap portion 12e(2).

In use, a user may interact with first input element segment 20e(1) to initiate re-shaping first SMP strap portion 12e(1) back to its default shape and may interact with second input element segment 20e(2) to initiate re-shaping second SMP strap portion 12e back to its default shape. In various embodiments, the interactions can be taps, swipes, gestures, voice commands, etc. In this manner, a user may attach wearable electronic device 10e to the user's person and size the device according to the user's desires.

For example, input logic can be configured in wearable electronic device 10e to determine whether a user input such as a touch or gesture may be registered by first input element segment 14e(1) or second input element segment 14e(2) and may output input data, which may indicate which input element segment registered the interaction. In an embodiment, shape memory control logic in wearable electronic device 10e may receive the input data and based thereon may determine whether to apply current to first or second heating device 18e(1) or 18e(2), respectively.

Turning to FIG. 5B, FIG. 5B is a simplified side view illustrating an embodiment of wearable electronic device 10e in accordance with an embodiment of the present disclosure. As illustrated in FIG. 5B, each of the first and second SMP strap portions 12e(1) and 12e(2) may have their own respective default shape, which, in combination with coupling elements 50, may give wearable electronic device 10e a default diameter $D_{DEFAULT}$.

FIG. 5C is a simplified side view illustrating an embodiment of wearable electronic device 10e in accordance with an embodiment of the present disclosure. As illustrated in FIG. 5B, each of the first and second SMP strap portions 12e(1) and 12e(2) may be deformed to a corresponding deformed shape, which, in combination with coupling elements 50, may give wearable electronic device 10e a deformed diameter $D_{DEFORM}$.

Figure 5D:
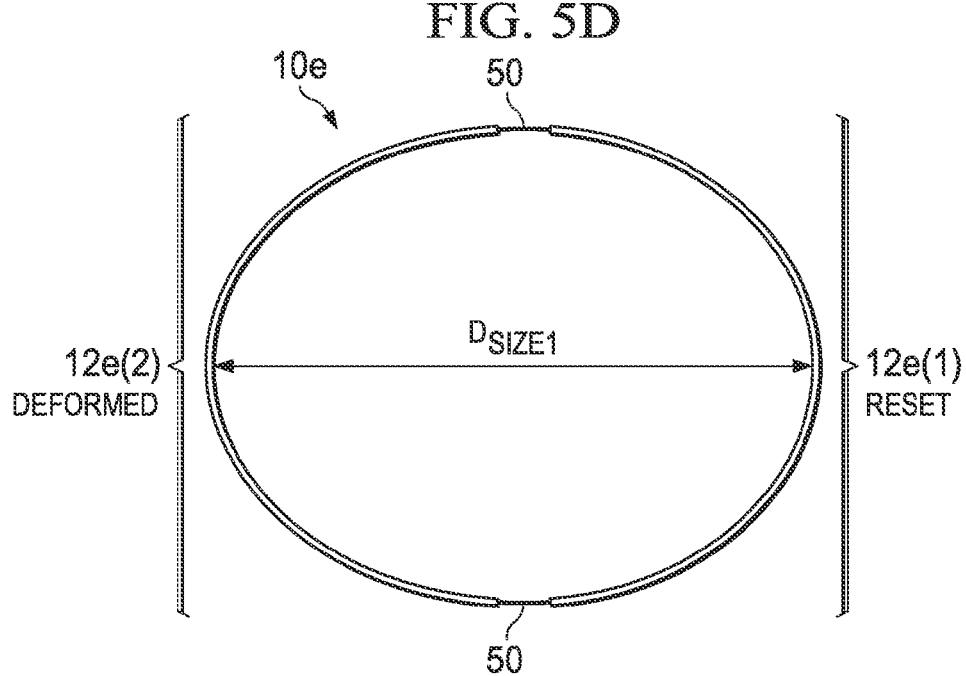
FIG. 5D is a simplified side view illustrating an embodiment of a wearable electronic device, in accordance with one embodiment of the present disclosure.

FIG. 5D is a simplified side view illustrating an embodiment of wearable electronic device 10e in accordance with an embodiment of the present disclosure. As illustrated in FIG. 5D, the first SMP strap portion 12e(1) may be reset to its default shape (e.g., following one or more user inputs to first input segment 14e(1)) and the second SMP strap portion 12e(2) may be left in its deformed shape. Resetting the first SMP strap portion 12e(1) to its default shape may give wearable electronic device 10e an intermediate diameter size $D_{INT}$ between the deformed diameter $D_{DEFORM}$ and the default diameter $D_{DEFAULT}$, thereby giving a user the ability to size wearable electronic device to the user's desire. Adding additional SMP strap portions to a wearable electronic device can thus provide additional intermediate sizing options to the wearable electronic device. Of course, because first and second SMP strap portions 12e(1) and 12e(2) can be deformed (e.g., stretched, bent, etc.) to almost any shape, the variations in sizing options for wearable electronic device 10a are vast.

Figure 5E:
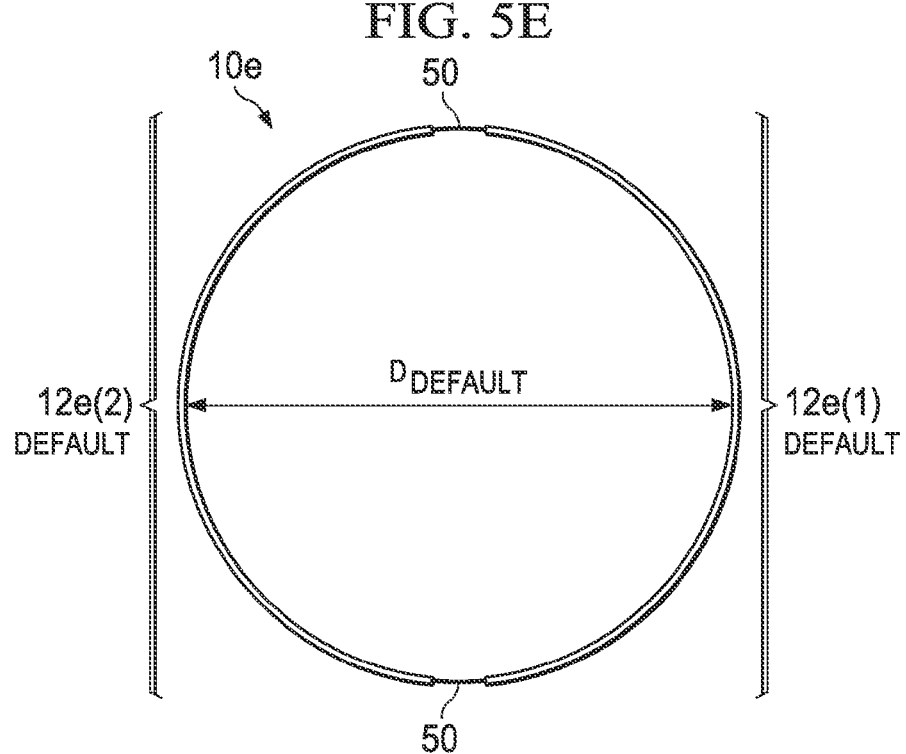
FIG. 5E is a simplified side view illustrating an embodiment of a wearable electronic device, in accordance with one embodiment of the present disclosure.

FIG. 5E is a simplified side view illustrating an embodiment of wearable electronic device 10e in accordance with an embodiment of the present disclosure. As illustrated in FIG. 5E, both the first and second SMP strap portions 12e(1) and 12e(2) have been reset back to their default shape, which, in combination with coupling elements 50, may return wearable electronic device 10e to its default diameter $D_{DEFAULT}$.

Turning to FIG. 6A, FIG. 6A is a simplified orthographic view illustrating an embodiment of a wearable electronic device 10f in accordance with one embodiment of the present disclosure. Wearable electronic device 10f may include multiple strap portions 12f(1)-(5) [a first strap portion 12f(1), a second strap portion 12f(2), a third strap portion 12f(3), a fourth strap portion 12f(4) and a fifth strap portion 12f(5)], which may have a pair of SMA wires 40(1)-(2) configured therein. SMA wires 41(1)-(2) may pass freely through strap portions 12f(2)-(5) and may have ends, which may meet in a first strap portion 12f(1). First strap portion 12f(1) may further include an input portion 14f, including an input element 20f. In an embodiment, SMA wires 40(1)-(2) may serve to link together each of strap portions 12f(1)-12f(5). Although input portion 12f is shown as being contained within strap portion 12f(1), it could certainly be included in other portions in alternative embodiments of the present disclosure.

In one or more embodiments, SMA wires 40(1)-(2) may be formed to have a default shape, which may correspond to a circular shape of wearable electronic device 10f with each strap portions 12f(1)-(5) butted against each other, as shown in FIG. 6A. Wearable electronic device 10e may be of a continuous construction, e.g., having no ends. In one or more embodiments, the default shape of SMA wires 40(1)-(2) in combination with strap portions 12f(1)-(5) may give wearable electronic device 10f a default diameter $D_{DEFAULT}$. In various embodiments, $D_{DEFAULT}$ can be configured based on the overall length of wearable electronic device 10e, which can range from approximately 5 inches to approximately 10 inches in length. Similar to the dimensions discussed above, the dimensions of wearable electronic device 10f can be altered as determined by any designer and remain with the scope of the present disclosure.

Wearable electronic device 10f can be sized to snuggly fit on a user's person from a deformed shape back to the default shape of wearable electronic device 10f by resetting SMA wires 40(1)-(2) back to their default shapes. In one or more embodiments, SMA wires 40(1)-(2) may be surrounded by an insulating layer or coating within strap portions 12f(1)-(5). Although five strap portions 12f(1)-(5) are shown in FIG. 5A, it should be understood that any number of strap portions can be configured for a wearable electronic device and, thus, are clearly within the scope of the present disclosure. Further, although strap portions 12f(2)-(5) are shown as being enclosed, they could also be open framed, it should be understood that the strap portions can be of any ornamental design within the scope of the present disclosure. Similarly, although a pair of SMA wires 40(1), 40(2) are shown in FIG. 6A, it should be understood that more or fewer SMA wires could be configured for a wearable electronic device and, thus, are clearly within the scope of the present disclosure.

In or more embodiments, strap portions 12f(1)-(5) can be made of one or more flexible materials including but not limited to, metals, metal alloys, polymers, plastics, rubbers, neoprene, elastics, elastomers, fiberglass composites, carbon fiber composites, woods, silicone, polycarbonates, vinyl, polypropylene, polystyrene, polyethylene, combinations thereof or the like. In one or more embodiments, strap portions 12f(1)-(5) may be surrounded by a covering, which can be made of natural fabrics, synthetic fabrics, fibers and blends thereof (e.g., cotton, polyester, nylon, satin, silk, wool, leather, etc.), metals, metal alloys, polymers, rubbers, elastics, elastomers, neoprene, fiberglass composites, carbon fiber composites, woods, silicone, polycarbonates, vinyl, polypropylene, polystyrene, polyethylene, combinations thereof or the like. In one or more embodiments, electronics (e.g., processors, controllers, batteries, circuitry, etc.) for wearable electronic device 10f may reside in either first strap portion 12f(1) or any other strap portion where SMA wires 40(1)-(2) may meet.

In use, a user may interact with input element 20f to initiate re-shaping SMA wires 40(1)-(2) within strap portions 12f(1)-(5), which may thereby re-shape wearable electronic device to its default diameter $D_{DEFAULT}$. In various embodiments, the interactions can be taps, swipes, gestures, voice commands, etc. In an embodiment, shape memory control logic may receive the input data for one or more user inputs registered by input element 20f and may apply a current to SMA wires 40(1)-(2) to reshape the SMA wires from a deformed shape back to their default curved shape.

Figure 6B:
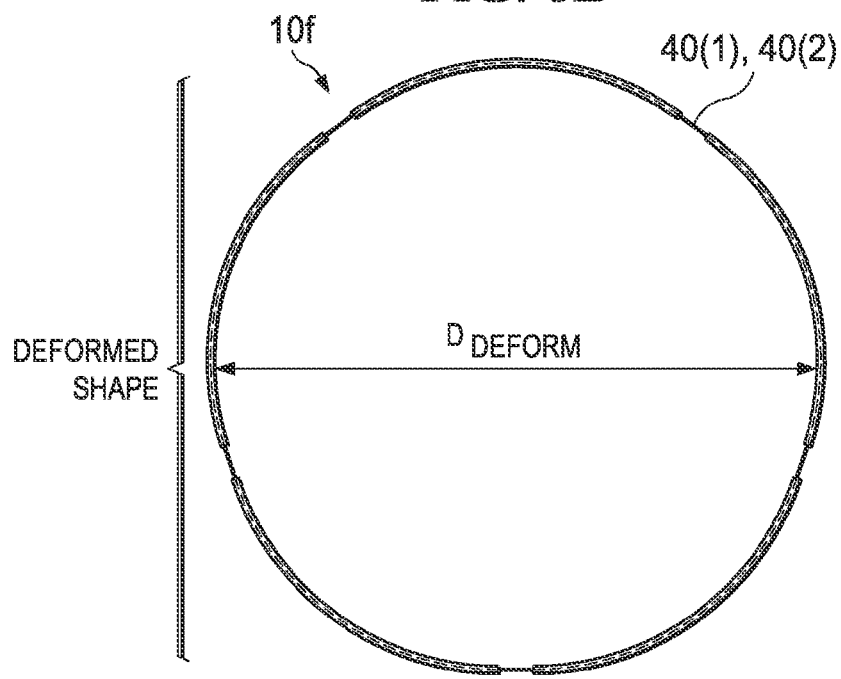
FIG. 6B is a simplified side view illustrating an embodiment of a wearable electronic device, in accordance with one embodiment of the present disclosure.

Turning to FIG. 6B, FIG. 6B is a simplified side view illustrating an embodiment of wearable electronic device 10f in accordance with one embodiment of the present disclosure. As illustrated in FIG. 6BB, SMA wires 40(1)-(2) may be deformed (e.g., stretched, bent, etc.) to a corresponding deformed shape, which may give wearable electronic device 10f a deformed diameter $D_{DEFORM}$.

Figure 6C:
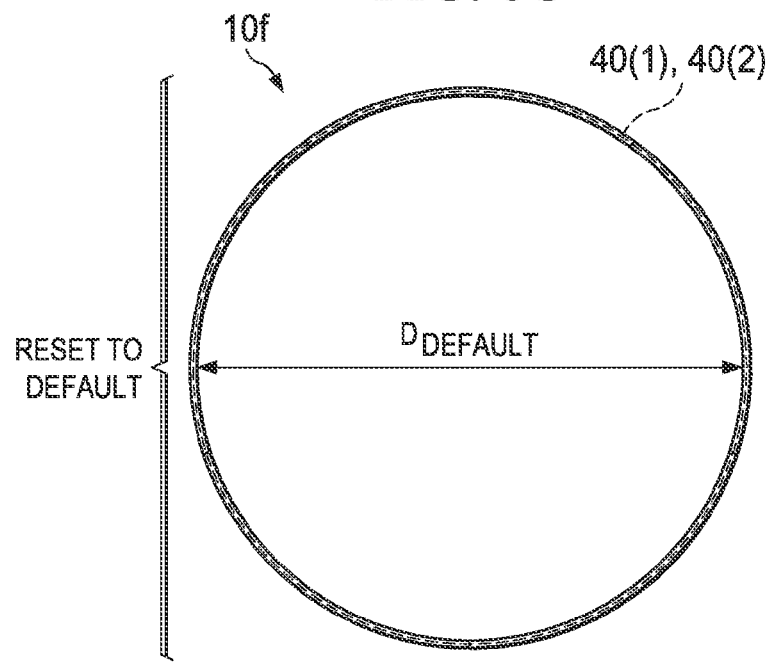
FIG. 6C is a simplified side view illustrating an embodiment of a wearable electronic device, in accordance with one embodiment of the present disclosure.

FIG. 6C is a simplified side view illustrating an embodiment of wearable electronic device 10f, in accordance with one embodiment of the present disclosure. As illustrated in FIG. 6C, SMA wires 40(1)-(2) have been reset back to their default shape, which may return wearable electronic device 10e to its default diameter $D_{DEFAULT}$.

Figure 7:
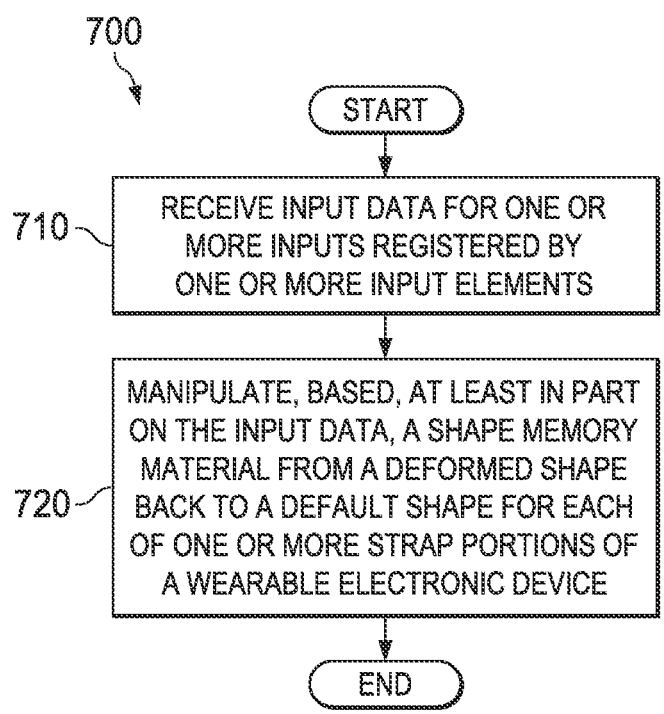
FIG. 7 is a simplified flow diagram illustrating potential operations associated with one embodiment of the present disclosure.

Turning to FIG. 7, FIG. 7 is a simplified flow diagram 700 illustrating potential operations for a wearable electronic device system in accordance with one embodiment of the present disclosure. The operations may be used to open, close or adjust the size of a wearable electronic device. At 710, the system may receive input data for one or more inputs registered by one or more input elements. In various embodiments, the input data may correspond to one or more touch inputs, gesture inputs, etc. or other interactions registered by the one or more input elements. At 720, the system may manipulate, based, at least in part on the input data, a shape memory material from a deformed shape back to a default shape for each of one or more strap portions of a wearable electronic device. In one or more embodiments, each of the one or more strap portions may comprise the shape memory material.

In one or more embodiments, the shape memory material may be an SMA configured as an SMA wire within each of the one or more strap portions of the wearable electronic device. In such embodiments, the system may manipulate, based, at least in part, on the input data, the SMA wire by applying a current to the SMA wire. In one or more embodiments, the wearable electronic device may include an SMA configured within each of one or more strap portions as at least one first SMA wire that has a default shape that corresponds to a closed configuration of the wearable electronic device and at least one second SMA wire that has a default shape that corresponds to an opened configuration of the wearable electronic device. In such embodiments, the system may independently manipulate, based, at least in part, on the input data, each of the at least one first SMA wire and the at least one second SMA wire by separately applying a current to each of the at least one first SMA wire and the at least one second SMA wire to open or close a particular strap portion of the wearable electronic device. In one or more embodiments, the shape memory material may be an SMP and each of the one or more strap portions may be made of the SMP. In such embodiments, the system may manipulate each of the one or more strap portions made of the SMP by applying a current to a heating device configured within each of the one or more strap portions.

Figure 8:
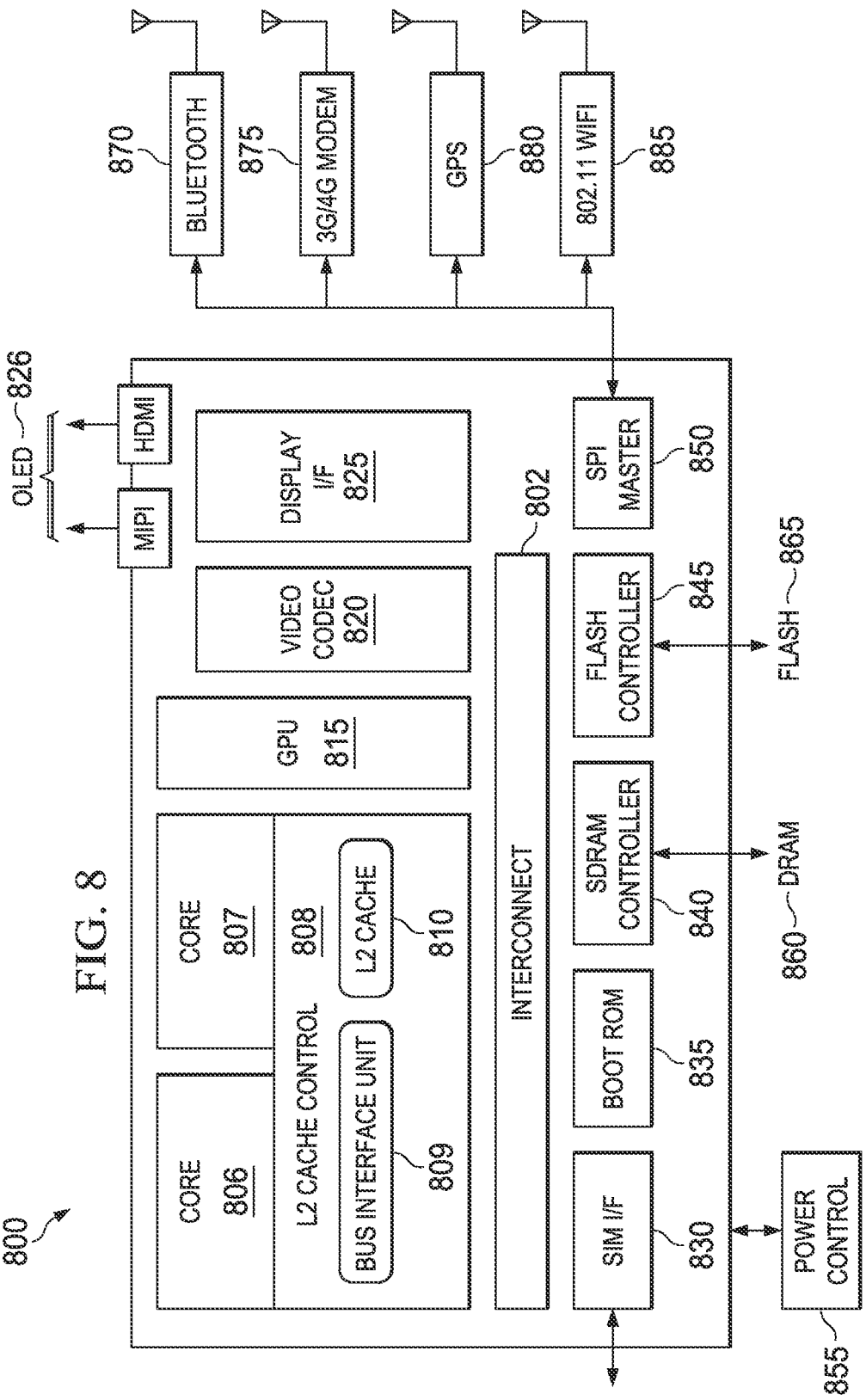
FIG. 8 is a simplified block diagram associated with an example ARM ecosystem on chip (SOC) of the present disclosure.

Turning to FIG. 8, FIG. 8 is a simplified block diagram associated with an example ARM ecosystem SOC 800 of the present disclosure. At least one example implementation of the present disclosure can include the shape memory features discussed herein and an ARM component. For example, the example of FIG. 8 can be associated with any ARM core (e.g., A-9, A-15, etc.). Further, the architecture can be part of any type of wearable electronic device, tablet, smartphone (inclusive of Android™ phones, i-Phones™), i-Pad™, Google Nexus™, Microsoft Surface™, video processing components, laptop computer (inclusive of any type of notebook), Ultrabook™ system, any type of touch-enabled input element, etc., which may include a shape memory material such as an SMA, an SMP, or both.

In this example of FIG. 8, ARM ecosystem SOC 800 may include multiple cores 806-807, an L2 cache control 808, a bus interface unit 809, an L2 cache 810 and an interconnect 802. In one or more embodiments of a wearable electronic device that may include a display screen in combination with a touch screen (e.g., an input element), ARM ecosystem SOC 800 may include a graphics processing unit (GPU) 815, a video codec 820, and a display I/F 825, which may be associated with mobile industry processor interface (MIPI)/high-definition multimedia interface (HDMI) links that may couple to an OLED display 826.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiments can include one or more communication capabilities, interfaces, and features such as instances of Bluetooth™ 870, a 3G/4G modem 875, a global positioning system (GPS) 880, and an 802.11 WiFi 885.

In operation, the example of FIG. 8 can offer processing capabilities, along with relatively low power consumption to enable computing of various types (e.g., mobile computing). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
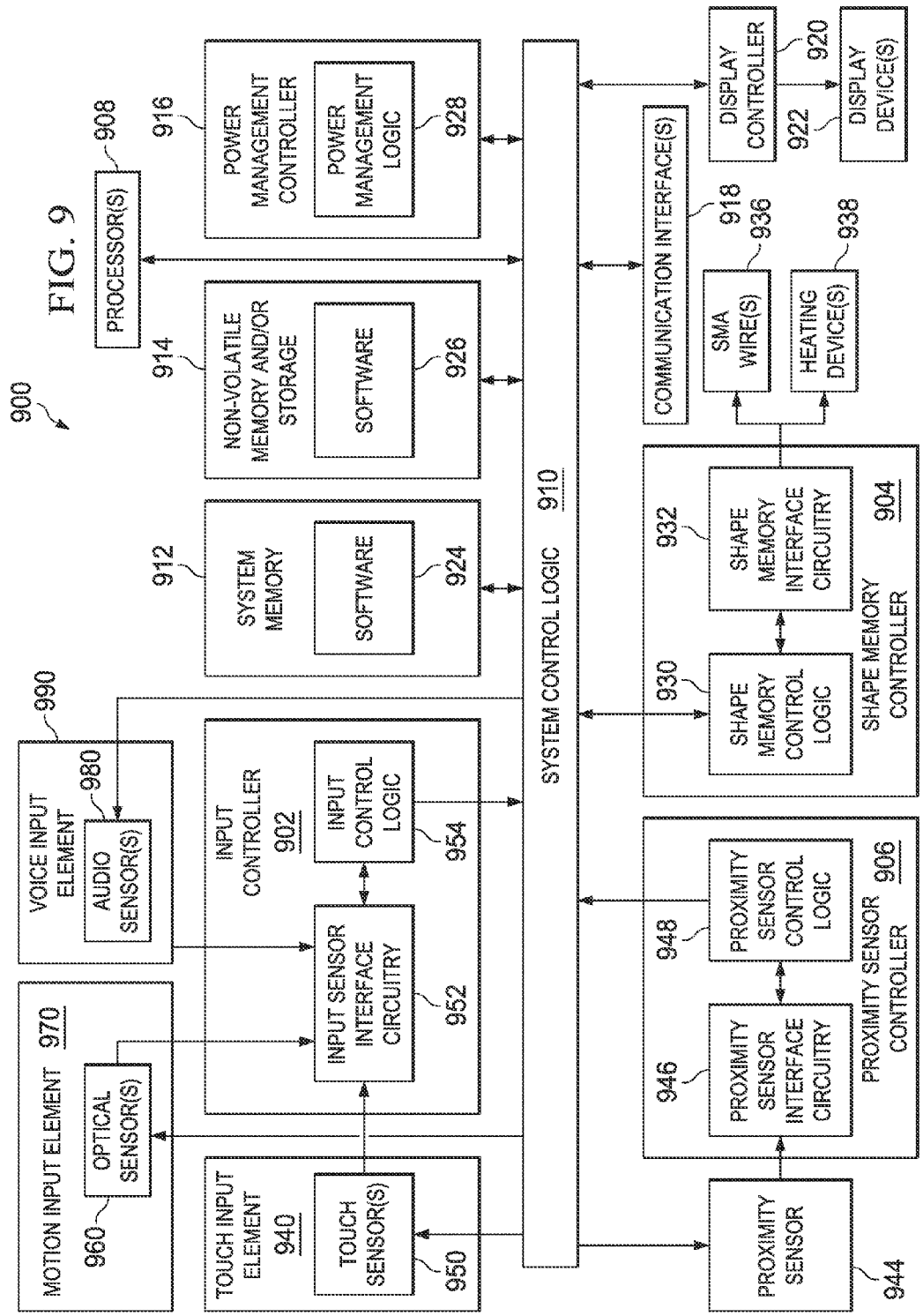
FIG. 9 is a simplified block diagram illustrating example logic that may be used to execute activities associated with the present disclosure.

Turning to FIG. 9, FIG. 9 is a simplified block diagram illustrating potential electronics and logic that may be associated with wearable electronic device 10a, 10b, 10c, 10d, 10e and 101 discussed herein. In at least one example embodiment, system 900 can include an input controller 902, a shape memory controller 904, a proximity sensor controller 905, one or more processors 908, system control logic 910 coupled to at least one of processor(s) 908, system memory 912 coupled to system control logic 910, non-volatile memory and/or storage device(s) 914 coupled to system control logic 910, display controller 920 coupled to system control logic 910, display controller 920 coupled to one or more display device(s) 922, power management controller 916 coupled to system control logic 910 and/or communication interface(s) 918 coupled to system control logic 910.

Hence, the basic building blocks of any wearable electronic device system (e.g., processor, controller, memory, I/O, display, etc.) can be used in conjunction with the teachings of the present disclosure. Certain components could be discrete or integrated into a System on Chip (SoC). Some general system implementations can include certain types of form factors in which system 900 is part of a more generalized form factor. In alternate implementations, instead of wearable electronic devices, certain alternate embodiments deal with mobile phones, tablet devices, etc.

System control logic 910, in at least one embodiment, can include any suitable interface controllers to provide for any suitable interface to at least one processor 908 and/or to any suitable device or component in communication with system control logic 910. System control logic 910, in at least one embodiment, can include one or more memory controllers to provide an interface to system memory 912. System memory 912 may be used to load and store data and/or instructions, for example, for system 900. System memory 912, in at least one embodiment, can include any suitable volatile memory, such as suitable dynamic random access memory (DRAM) for example. System memory 912 may store suitable software 924 and/or non-volatile memory and/or storage device(s). System control logic 910, in at least one embodiment, can include one or more I/O controllers to provide an interface to input controller 902, shape memory controller 904, proximity sensor controller 906, display device 922, power management controller 916, non-volatile memory and/or storage device(s) 914.

Non-volatile memory and/or storage device(s) 914 may be used to store data and/or instructions, for example within software 926. Non-volatile memory and/or storage device(s) 914 may include any suitable non-volatile memory, such as flash memory for example, and/or may include any suitable non-volatile storage device(s), such as one or more hard disc drives (HDDs), solid state drives (SSDs), etc. for example.

Power management controller 916 may include power management logic 928 configured to control various power management and/or power saving functions. In at least one example embodiment, power management controller 916 is configured to reduce the power consumption of components or devices of system 900 that may either be operated at reduced power or turned off when the wearable electronic device is in an inactive state (e.g., not being accessed, etc.). For example, in at least one embodiment, when the wearable electronic device is in an inactive state, power management controller 916 performs one or more of the following: power down the unused portion of touch input element 940; allow one or more of processor(s) 908 to go to a lower power state if less computing power is required during times of inactivity; and shutdown any devices and/or components that may be unused when a wearable electronic device is in an inactive state. System control logic 910, in at least one embodiment, can include one or more I/O controllers to provide an interface to any suitable input/output device(s) for example, an audio device to help convert sound into corresponding digital signals and/or to help convert digital signals into corresponding sound.

For at least one embodiment, at least one processor 908 may be packaged together with logic for one or more controllers of system control logic 910. In at least one embodiment, at least one processor 908 may be packaged together with logic for one or more controllers of system control logic 910 to form a System in Package (SiP). In at least one embodiment, at least one processor 908 may be integrated on the same die with logic for one or more controllers of system control logic 910. For at least one embodiment, at least one processor 908 may be integrated on the same die with logic for one or more controllers of system control logic 910 to form a System on Chip (SoC).

For at least one embodiment, input controller 902 may include input sensor interface circuitry 952 and input control logic 954. In one or more embodiments, input sensor interface circuitry 952 and input control logic 954 may be configured to receive inputs from a plurality of input elements, such as, for example, touch sensor(s) 950, optical sensor(s) 960 and/or audio sensor(s) 980. Thus, the circuitry, electronics, etc. for input sensor interface circuitry 952 and/or logic for input control logic 954 may be adapted to detect inputs from a variety of different types of input elements, depending on implementation For touch control, input controller 902 may include input sensor interface circuitry 952 and input control logic 954. Input sensor interface circuitry 952 may be coupled to one or more touch sensor(s) 950 to detect touch input(s) over a first touch surface layer and a second touch surface layer of a touch input element 940 or, in certain embodiments, a display (e.g., at least one display device 922) in combination with a touch input element. Input sensor interface circuitry 952 may include any suitable circuitry that may depend, for example, at least in part on the touch-sensitive technology used for touch input element 940, which may include one or more touch sensor(s) 950. Input sensor interface circuitry 952, in one embodiment, may support any suitable multi-touch technology. Input sensor interface circuitry 952, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Input control logic 954 may be coupled to input sensor interface circuitry 952 to help control input sensor interface circuitry 952 in any suitable manner to detect touch input over a first touch surface layer and a second touch surface layer. Input control logic 954 for at least one example embodiment may also be coupled to system control logic 910 to output in any suitable manner digital input data, which may include digital touch input data corresponding to one or more touch inputs detected by input sensor interface circuitry 952. Input control logic 954 may be implemented using any suitable logic, including any suitable hardware, firmware, and/or software logic (e.g., non-transitory tangible media), that may depend, for example, at least in part on the circuitry used for input sensor interface circuitry 952. Input control logic 954 for at least one embodiment may support any suitable multi-touch technology.

Input control logic 954 may be coupled to system control logic 910 to output digital input data, which may include touch input data, to system control logic 910 and/or at least one processor 908 for processing. For example, the processing may include determining which of one or more SMA wires to apply a current, which of one or more heating devices to apply a current, etc. At least one processor 908 for at least one embodiment may execute any suitable software to process digital input data, which may include digital touch input data output from input control logic 954. Suitable software may include, for example, any suitable driver software and/or any suitable application software.

For motion control, input sensor interface circuitry 952 may be coupled to one or more optical sensor(s) 960 to detect gesture input(s) over a motion input element 970 or, in certain embodiments, a display (e.g., at least one display device 922) in combination with a motion input element. For motion control, input sensor interface circuitry 952 may include any suitable circuitry that may depend, for example, at least in part on the motion sensing technology used for motion input element 970. For example, motion input element 970 may include an infrared projector which may project infrared light (visible or invisible) above motion input element 970. Optical sensor 960 may receive reflections of infrared light for gestures or motions and motion input element 970 may register the inputs. Input sensor interface circuitry 952, in one embodiment, may support any gesture and/or motion recognition technology. Input sensor interface circuitry 952, in at least one embodiment, can include any suitable circuitry to convert analog or digital signals corresponding to a reflected light for one or more gestures into any suitable digital optical input data. Suitable digital motion input data for at least one embodiment may include, for example, gesture location or coordinate data.

Input control logic 954 may be coupled to input sensor interface circuitry 952 to help control input sensor interface circuitry 952 in any suitable manner to detect gesture inputs over motion input element 970. Input control logic 954 for at least one example embodiment may also be coupled to system control logic 910 to output in any suitable manner digital input data, which may include digital motion input data corresponding to one or more gesture inputs detected by input sensor interface circuitry 952. Input control logic 954 may be implemented using any suitable logic, including any suitable hardware, firmware, and/or software logic (e.g., non-transitory tangible media), that may depend, for example, at least in part on the circuitry used for input sensor interface circuitry 952 for use in conjunction with any technology used in motion input element 970. Input control logic 954 for at least one embodiment may support any suitable gesture recognition or motion sensing technology.

Input control logic 954 may be coupled to system control logic 910 to output digital input data, which may include digital motion input data, to system control logic 910 and/or at least one processor 908 for processing. For example, the processing may include determining which of one or more SMA wires to apply a current, which of one or more heating devices to apply a current, etc. At least one processor 908 for at least one embodiment may execute any suitable software to process digital input data, which may include digital motion input data output from input control logic 954. Suitable software may include, for example, any suitable driver software and/or any suitable application software.

For voice control, input sensor interface circuitry 952 may be coupled to one or more audio sensor(s) 980 to receive voice commands spoken to a voice input element 990. For voice control, input sensor interface circuitry 952 may include any suitable circuitry that may depend, for example, at least in part on the voice sensing technology used for voice input element 990. In one or more embodiments, voice input element 990 may include a microphone, a piezoelectric pick-up device, a microelectromechanical systems (MEMS) sensor, etc. Input sensor interface circuitry 952, in one embodiment, may support any voice recognition technology. Input sensor interface circuitry 952, in at least one embodiment, can include any suitable circuitry to convert analog signals corresponding to a received audio wave for one or more voice commands into any suitable digital voice input data. Suitable digital voice input data for at least one embodiment may include, for example, modulated audio for use in signal processing logic, software, etc.

Input control logic 954 may be coupled to input sensor interface circuitry 952 to help control input sensor interface circuitry 952 in any suitable manner to detect voice inputs made to voice input element 990. Input control logic 954 for at least one example embodiment may also be coupled to system control logic 910 to output in any suitable manner digital input data, which may include digital voice input data corresponding to one or more voice inputs detected by input sensor interface circuitry 952. Input control logic 954 may be implemented using any suitable logic, including any suitable hardware, firmware, and/or software logic (e.g., non-transitory tangible media), that may depend, for example, at least in part on the circuitry used for input sensor interface circuitry 952 for use in conjunction with any technology used in voice input element 990. Input control logic 954 for at least one embodiment may support any suitable voice recognition technology.

Input control logic 954 may be coupled to system control logic 910 to output digital input data, which may include digital voice input data, to system control logic 910 and/or at least one processor 908 for processing. For example, the processing may include determining which of one or more SMA wires to apply a current, which of one or more heating devices to apply a current, etc. At least one processor 908 for at least one embodiment may execute any suitable software to process digital input data, which may include digital voice input data output from input control logic 954. Suitable software may include, for example, any suitable driver software and/or any suitable application software.

Shape memory controller 904 may provide for control of a shape memory material. Shape memory controller 904 may include shape memory control logic 930 and shape memory interface circuitry 932. In various embodiments, shape memory control logic 930 may control the application of a current to one or more SMA wire(s) 936 for one or more strap portions of a wearable electronic device and/or control the application of a current to one or more heating device(s) 938 configured in one or more SMP strap portions (e.g., made of an SMP) of a wearable electronic device.

In various embodiments, one or more SMA wire(s) 936 configured in one or more strap portions of a wearable electronic device may be coupled to shape memory interface circuitry 932, which may be used in combination with shape memory control logic 930 to manipulate the one or more SMA wire(s) 936 from a deformed shape back to a default shape. Shape memory interface circuitry 932 may be used to apply a current to each of one or more SMA wire(s) 936 to manipulate the wires from a deformed shape back to a default shape for each wire. Shape memory interface circuitry 932 may include any suitable circuitry that may depend, for example, at least in part on the type, size, shape, etc. of SMA wire(s) 936 that may be used in a wearable electronic device.

In various embodiments that may include one or more SMA wire(s) 936, shape memory interface circuitry 932 may be coupled to shape memory control logic 930, which may help shape memory interface circuitry 932 to apply a current by determining when and to which of one or more SMA wire(s) 936 to apply a current to, based, at least in part, on input data output by input control logic 954 (e.g., touch input data, motion input data, voice input data, etc.). Shape memory control logic 930 may also help to determine when to remove or deactivate the current from one or more SMA wires 936. In some embodiments, shape memory control logic 930 may also help in the application or removal of a current based on proximity sensor data, which may be received from proximity sensor control logic 948.

In various embodiments, one or more heating devices 938 configured in one or more SMP strap portions (e.g., made of an SMP) of a wearable electronic device may be coupled to shape memory interface circuitry 932, which may be used in combination with shape memory control logic 930 to manipulate the one or more SMP strap portions from a deformed shape to a default shape using one or more heating devices 938. Shape memory interface circuitry 932 may be used to apply a current to each of one or more heating devices 938 to manipulate each of the one or more SMP strap portions from a deformed shape back to its default shape. Shape memory interface circuitry 932 may include any suitable circuitry that may depend, for example, at least in part on the type, size, shape, etc. of SMP strap portions and heating device(s) 938 that may be used in a wearable electronic device.

In various embodiments that may include one or more SMP strap portions and one or more heating device(s) 938, shape memory interface circuitry 932 may be coupled to shape memory control logic 930, which may help shape memory interface circuitry 932 to apply a current by determining when and to which of one or more heating device(s) 938 to apply a current to, based, at least in part, on input data output by input control logic 954. Shape memory control logic 930 may also help to determine when to remove or deactivate the current from one or more heating device(s) 938. In some embodiments, shape memory control logic 930 may also help in the application or removal of current based on proximity sensor data, which may be received from proximity sensor control logic 948.

For control of various shape memory material manipulations based on whether a wearable electronic device may be in an opened or closed configuration, proximity sensor controller 906 may include proximity sensor interface circuitry 946 and proximity sensor control logic 948. Proximity sensor interface circuitry 946 may be coupled to proximity sensor 944 to detect when the ends of a particular strap portion, one of which may have the proximity sensor configured therein, may be in contact. Proximity sensor interface circuitry 946 may include any type of circuitry may include any suitable circuitry that may depend, for example, at least in part on the proximity sensor technology (e.g., inductive, magnetic, etc.) that may be used in a wearable electronic device. Proximity sensor interface circuitry 946, in at least one embodiment, can include any suitable circuitry to convert analog signals received from proximity sensor 944 into any suitable digital proximity sensor data. Suitable digital proximity data for at least one embodiment may include, for example, different signals indicating whether the proximity sensor detects or does not detect an opposing end of a strap portion.

Proximity sensor control logic 948 may be coupled to proximity sensor interface circuitry 946 to help control proximity sensor interface circuitry 946 in any suitable manner to detect an opposing strap portion end. Proximity sensor control logic 948 for at least one example embodiment may also be coupled to system control logic 910 to output in any suitable manner digital proximity sensor data corresponding to an opposing strap portion end detected by proximity sensor interface circuitry 946. Proximity sensor control logic 948 may be implemented using any suitable logic, including any suitable hardware, firmware, and/or software logic (e.g., non-transitory tangible media), that may depend, for example, at least in part on the circuitry used for proximity sensor interface circuitry 946.

Proximity sensor control logic 948 may be coupled to system control logic 910 to output digital proximity sensor data to system control logic 910 and/or at least one processor 908 for processing. At least one processor 908 for at least one embodiment may execute any suitable software to process proximity sensor data output from proximity sensor control logic 948. Suitable software may include, for example, any suitable driver software and/or any suitable application software.

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., width, length, thickness, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include one or more strap portions, wherein each of the one or more strap portions comprise a shape memory material, which has a default shape, and wherein at least one strap portion further comprises at least one input element configured to register one or more inputs; and logic configured to receive input data based the one or more inputs and to manipulate, based, at least in part, on the input data, the shape memory material for each of the one or more strap portions from a deformed shape back to its default shape.

Note, that in at least one embodiment the shape memory material is a shape memory alloy (SMA) configured within each of the one or more strap portions as at least one first SMA wire that has a first default shape that corresponds to a closed configuration for the wearable electronic device and at least one second SMA wire that has a second default shape that corresponds to an opened configuration for the wearable electronic device, and wherein the logic is further configured to separately apply, based, at least in part on the input data, a current to each of the at least one first SMA wire or the at least one second SMA wire to open or close a particular strap portion of the wearable electronic device. Note also, that in at least one embodiment, that each of the one or more strap portions is made of the shape memory material, which is a shape memory polymer, and wherein the logic is further configured to manipulate, based on the input data, each of the one or more strap portions to their respective default shapes by applying current to a heating device configured within each of the one or more strap portions.

In another example implementation, the wearable electronic device may include logic, at least a portion of which is partially implemented in hardware, the logic configured to receive input data for one or more inputs registered by one or more input elements; and manipulate, based, at least in part, on the input data, a shape memory material from a deformed shape to a default shape for each of one or more strap portions of the wearable electronic device, wherein each of the one or more strap portions comprise the shape memory material Other Notes And Examples The following examples pertain to embodiments in accordance with this Specification. Note that all optional features of the apparatuses and systems described above may also be implemented with respect to the methods or processes described herein and specifics in the examples may be used anywhere in one or more embodiments.

Example 1 is a wearable electronic device, comprising: one or more strap portions, wherein each of the one or more strap portions comprise a shape memory material, which has a default shape, and wherein at least one strap portion further comprises: at least one input element configured to register one or more inputs; and logic configured to receive input data based the one or more inputs and to manipulate, based, at least in part, on the input data, the shape memory material for each of the one or more strap portions from a deformed shape back to its default shape.

In Example 2, the subject matter of Example 1 can optionally include the shape memory material being a shape memory alloy (SMA) configured as an SMA wire within each of the one or more strap portions, and wherein the logic is further configured to manipulate, based, at least in part on the input data, the SMA wire back to its default shape by applying current to the SMA wire.

In Example 3, the subject matter of Example 1 can optionally include the shape memory material being a shape memory alloy (SMA) configured within each of the one or more strap portions as at least one first SMA wire that has a first default shape that corresponds to a closed configuration for the wearable electronic device and at least one second SMA wire that has a second default shape that corresponds to an opened configuration for the wearable electronic device, and wherein the logic is further configured to separately apply, based, at least in part on the input data, a current to each of the at least one first SMA wire or the at least one second SMA wire to open or close a particular strap portion of the wearable electronic device.

In Example 4, the subject matter of Example 3 can optionally include a proximity sensor configured in one end of the strap portion configured to detect when the wearable electronic device is in a closed or open configuration, wherein the logic is further configured to separately apply the current to the at least one first SMA wire or the at least one second SMA wire based additionally on whether the wearable electronic device is, respectively, in an opened or closed configuration.

In Example 5, the subject matter of Example 1 can optionally include the one or more strap portions being made of the shape memory material, which is a shape memory polymer, and wherein the logic is further configured to manipulate, based on the input data, each of the one or more strap portions to their respective default shapes by applying a current to a heating device configured within each of the one or more strap portions.

In Example 6, the subject matter of Example 5 can optionally include a proximity sensor configured in one end of a particular strap portion, wherein the logic is further configured to remove the current from each heating device when the proximity sensor detects an opposing end of the strap portion.

In Example 7, the subject matter of any one of Examples 5-6 can optionally include the logic being further configured to determine from the input data whether inputs are registered by certain segments of at least one input element and to apply a current to a particular heating device for inputs to a particular segment of the at least one input element that is associated with a particular strap portion that contains the particular heating device.

In Example 8, the subject matter of any one of Examples 1-7 can optionally include the input data including at least one of: touch input data corresponding to one or more touches registered by a touch input element; motion input data corresponding to one or more gestures registered by a motion input element; and voice input data corresponding to one or more voice commands registered by a voice input element.

In Example 9, the subject matter of any one of Examples 1-8 can optionally include a first input element configured to register one or more inputs on an outer surface of the strap portion that includes the first input element; and a second input element configured to register one or more inputs on an inner surface of the strap portion that includes the second input element.

In Example 10, the subject matter of any one of Examples 1-9 can optionally include the input element being contained in an input portion that is secured to the strap portion and wherein the input portion further includes an organic light emitting diode (OLED) display.

Example 11 is a wearable electronic device, comprising: logic, at least a portion of which is partially implemented in hardware, the logic configured to: receive input data for one or more inputs registered by one or more input elements; and manipulate, based, at least in part, on the input data, a shape memory material from a deformed shape to a default shape for each of one or more strap portions of the wearable electronic device, wherein each of the one or more strap portions comprise the shape memory material.

In Example 12, the subject matter of Example 11 can optionally include the shape memory material is a shape memory alloy (SMA) configured as at least one first SMA wire and at least one second SMA wire within each of the one or more strap portions, and wherein the logic is further configured to: manipulate, based, at least in part, on the input data, each of the at least one first SMA wire and the at least one second SMA wire back to its respective default shape by applying a current to each of the at least one first SMA wire and the at least one second SMA wire.

In Example 13, the subject matter of Example 12 can optionally include the default shape of the at least one first SMA wire being different than the default shape of the at least one second SMA wire and wherein the logic is further configured to: separately apply, based, at least in part, on the input data, the current to each of the at least one first SMA wire or the at least one second SMA wire.

In Example 14, the subject matter of any one of Examples 12-13 can optionally include the logic being further configured to remove the current from each of the at least one first SMA wire and the at least one second SMA wire after a predetermined period of time.

In Example 15, the subject matter of Example 11 can optionally include the one or more strap portions being made of the shape memory material, which is a shape memory polymer, and wherein the logic is further configured to: manipulate, based on the input data, each of the one or more strap portions to their respective default shape by applying a current to each of a heating device configured within each of the one or more strap portions.

In Example 16, the subject matter of Example 15 can optionally include the logic being configured to remove the current from the heating device configured within each of the one or more strap portions after a predetermined period of time.

In Example 17, the subject matter of Example 15 can optionally include the logic being further configured to: determine from the input data whether inputs are registered by certain segments of at least one input element; and apply a current to a particular heating device for inputs to a particular segment of the at least one input element that are associated with a particular strap portion that contains the particular heating device.

In Example 18, the subject matter of any one of Examples 11-17 can optionally include the input data including at least one of: touch input data corresponding to one or more touches registered by a touch input element; motion input data corresponding to one or more gestures registered by a motion input element; and voice input data corresponding to one or more voice commands registered by a voice input element.

Example 19 is at least one computer readable storage medium comprising instructions that, when executed, cause an apparatus to: receive input data for on one or more inputs registered by one or more input elements; and manipulate, based, at least in part, on the input data, a shape memory material from a deformed shape back to a default shape for each of one or more strap portions of a wearable electronic device, wherein each of the one or more strap portions comprise the shape memory material.

In Example 20, the subject matter of Example 19 can optionally include the shape memory material being a shape memory alloy (SMA) configured as at least one first SMA wire and at least one second SMA wire in each of the one or more strap portions and wherein the manipulation causes a current to be separately applied, based at least on the input data, to each of the at least one first SMA wire and the at least one second SMA wire.

In Example 21, the subject matter of Example 20 can optionally include the default shape of the at least one first SMA wire being different than the default shape of the at least one second SMA wire and wherein the manipulation causes the current to be separately applied, based, at least in part, on the input data to each of the at least one first SMA wire or the at least one second SMA wire.

In Example 22, the subject matter of any one of Examples 20-21 can optionally include the manipulation causing the current to be removed from each of the at least one first SMA wire and the at least one second SMA wire after a predetermined period of time.

In Example 23, the subject matter of Example 19 can optionally include the shape memory material being a shape memory polymer (SMP) and wherein each of the one or more strap portions is made of the SMP and wherein the manipulation causes a current to be applied to a heating device configured within each of the one or more strap portions.

In Example 24, the subject matter of Example 23 can optionally include the manipulation causing the current to be removed from the heating device configured within each of the one or more strap portions after a predetermined period of time.

In Example 25, the subject matter of Example 23 can optionally include instructions that, when executed, cause the apparatus to: determine from the input data whether inputs are registered by certain segments of at least one input element; and cause a current to be applied to a particular heating device for inputs to a particular segment of the at least one input element that are associated with a particular strap portion that contains the particular heating device.

In Example 26, the subject matter of any one of Examples 19-25 can optionally include the input data including at least one of: touch input data corresponding to one or more touches registered by a touch input element; motion input data corresponding to one or more gestures registered by a motion input element; and voice input data corresponding to one or more voice commands registered by a voice input element.

Example 27 is a method comprising: receiving input data for one or more inputs registered by one or more input elements; and manipulating, based, at least in part, on the input data, a shape memory material from a deformed shape back to a default shape for each of one or more strap portions of a wearable electronic device, wherein each of the one or more strap portions comprise the shape memory material.

In Example 28, the subject matter of Example 27 can optionally include the shape memory material being a shape memory alloy (SMA) configured within each of the one or more strap portions as at least one first SMA wire that has a first default shape that corresponds to a closed configuration for the wearable electronic device, and at least one second SMA wire that has a second default shape that corresponds to an opened configuration for the wearable electronic device, and wherein the manipulating includes separately applying, based, at least in part on the input data, a current to each of the at least one first SMA wire or the at least one second SMA wire to open or close a particular strap portion of the wearable electronic device.

In Example 29, the subject matter of Example 27 can optionally include the shape memory material being a shape memory alloy (SMA) configured as at least one first SMA wire and at least one second SMA wire in each of the one or more strap portions and wherein the manipulation causes a current to be separately applied, based at least on the input data, to each of the at least one first SMA wire and the at least one second SMA wire.

In Example 30, the subject matter of Example 29 can optionally include the default shape of the at least one first SMA wire being different than the default shape of the at least one second SMA wire and wherein the manipulating includes separately applying the current, based, at least in part, on the input data to each of the at least one first SMA wire or the at least one second SMA wire.

In Example 31, the subject matter of any one of Examples 28-30 can optionally include the manipulating including removing the current from each of the at least one first SMA wire and the at least one second SMA wire after a predetermined period of time.

In Example 32, the subject matter of Example 27 can optionally include the shape memory material being a shape memory polymer (SMP) and wherein each of the one or more strap portions is made of the SMP and wherein the manipulating includes applying a current to a heating device configured within each of the one or more strap portions.

In Example 33, the subject matter of Example 32 can optionally include removing the current from the heating device configured within each of the one or more strap portions after a predetermined period of time.

In Example 34, the subject matter of Example 32 can optionally include determining from the input data whether inputs are registered by certain segments of at least one input element; and applying a current to a particular heating device for inputs to a particular segment of the at least one input element that are associated with a particular strap portion that contains the particular heating device.

In Example 35, the subject matter of any one of Examples 27-34 can optionally include the input data including at least one of: touch input data corresponding to one or more touches registered by a touch input element; motion input data corresponding to one or more gestures registered by a motion input element; and voice input data corresponding to one or more voice commands registered by a voice input element.

Example 36 is an apparatus comprising means for performing the method of any one of Examples 27-35.

In Example 37, the subject matter of Example 36 can optionally include the means for performing the method comprising at least one processor and at least one memory element.

In Example 38, the subject matter of Example 37 can optionally include the at least one memory element comprising machine readable instructions that, when executed cause the apparatus to perform the method of any one of Examples 27-35.

In Example 39, the subject matter of any one of Examples 36-38 can optionally include the apparatus being a wearable electronic device system.

Example 40 is at least one computer readable medium comprising instructions that, when executed, implement a method or realize an apparatus as recited in any one of claims 1-18 or 27-35.

Example 41 is an apparatus comprising: means for receiving input data for one or more inputs registered by one or more input elements; and means for manipulating, based, at least in part, on the input data, a shape memory material from a deformed shape back to a default shape for each of one or more strap portions of a wearable electronic device, wherein each of the one or more strap portions comprise the shape memory material.

In Example 42, the subject matter of Example 41 can optionally include the shape memory material being a shape memory alloy (SMA) configured within each of the one or more strap portions as at least one first SMA wire that has a first default shape that corresponds to a closed configuration for the wearable electronic device, and at least one second SMA wire that has a second default shape that corresponds to an opened configuration for the wearable electronic device, and wherein the means for manipulating includes means for separately applying, based, at least in part on the input data, a current to each of the at least one first SMA wire or the at least one second SMA wire to open or close a particular strap portion of the wearable electronic device.

In Example 43, the subject matter of Example 41 can optionally include the shape memory material being a shape memory alloy (SMA) configured as at least one first SMA wire and at least one second SMA wire in each of the one or more strap portions and wherein the manipulation causes a current to be separately applied, based at least on the input data, to each of the at least one first SMA wire and the at least one second SMA wire.

In Example 44, the subject matter of Example 43 can optionally include the default shape of the at least one first SMA wire being different than the default shape of the at least one second SMA wire and wherein the manipulating includes separately applying the current, based, at least in part, on the input data to each of the at least one first SMA wire or the at least one second SMA wire.

In Example 45, the subject matter of any one of Examples 42-44 can optionally include the means for manipulating including means for removing the current from each of the at least one first SMA wire and the at least one second SMA wire after a predetermined period of time.

In Example 46, the subject matter of Example 41 can optionally include the shape memory material being a shape memory polymer (SMP) and wherein each of the one or more strap portions is made of the SMP and wherein the means for manipulating includes means for applying a current to a heating device configured within each of the one or more strap portions.

In Example 47, the subject matter of Example 46 can optionally include means for removing the current from the heating device configured within each of the one or more strap portions after a predetermined period of time.

In Example 48, the subject matter of any one of Examples 41-47 can optionally include the input data including at least one of: touch input data corresponding to one or more touches registered by a touch input element; motion input data corresponding to one or more gestures registered by a motion input element; and voice input data corresponding to one or more voice commands registered by a voice input element.

What is claimed is:

1. A wearable electronic device, comprising:
one or more straps, wherein each of the one or more straps comprise a shape memory material, wherein the shape memory material is a shape memory alloy (SMA) is configured within each of the one or more straps as at least one first SMA wire that has a first default shape that corresponds to a closed configuration for the wearable electronic device and at least one second SMA wire that has a second default shape that corresponds to an opened configuration for the wearable electronic device, and wherein at least one strap further comprises:
at least one input element configured to register one or more inputs; and
logic configured to receive input data based the one or more inputs and to separately apply, based, at least in part on the input data, a current to each of the at least one first SMA wire or the at least one second SMA wire to open or close the one or more straps of the wearable electronic device.

2. The wearable electronic device of claim 1, further comprising:
a proximity sensor configured in one end of the one or more straps configured to detect when the wearable electronic device is in a closed or open configuration, wherein the logic is further configured to separately apply the current to the at least one first SMA wire or the at least one second SMA wire based additionally on whether the wearable electronic device is, respectively, in an opened or closed configuration.

3. A wearable electronic device, comprising:
one or more straps, wherein each of the one or more straps is made of the shape memory material, which is a shape memory polymer, having a default shape, and wherein at least one strap further comprises:
at least one input element configured to register one or more inputs; and
logic configured to receive input data based the one or more inputs and to manipulate, based on the input data, each of the one or more straps to their respective default shapes by applying a current to each of a heating device configured to displace heat throughout the shape memory polymer within each of the one or more straps; and
a proximity sensor configured in one end of the one or more straps, wherein the logic is further configured to remove the current from each heating device when the proximity sensor detects an opposing end of the one or more straps.

4. The wearable electronic device of claim 3, wherein the logic is further configured to determine from the input data whether inputs are registered by certain segments of at least one input element and to apply a current to a heating device for inputs to a particular segment of the at least one input element that is associated with the one or more straps that contains the heating device.

5. The wearable electronic device of claim 1, wherein the received input data includes at least one of:
touch input data corresponding to one or more touches registered by a touch input element;
motion input data corresponding to one or more gestures registered by a motion input element; and
voice input data corresponding to one or more voice commands registered by a voice input element.

6. The wearable electronic device of claim 1, further comprising:
a first input element configured to register one or more inputs on an outer surface of the one or more straps that includes the first input element; and
a second input element configured to register one or more inputs on an inner surface of the one or more straps that includes the second input element.

7. The wearable electronic device of claim 1, wherein the input element is contained in an input portion that is secured to the one or more straps and wherein the input portion further includes an organic light emitting diode (OLED) display.

8. A wearable electronic device, comprising:
logic, at least a portion of which is partially implemented in hardware, the logic configured to:
receive input data for one or more inputs registered by one or more input elements; and
manipulate a shape memory material from a deformed shape to a default shape for each of one or more straps of the wearable electronic device, wherein the shape memory material is a shape memory alloy (SMA) configured as at least one first SMA wire having a first default shape and at least one second SMA wire having a second default shape different from the first default shape, and wherein the manipulation causes a current to be separately applied, based, at least in part, on the input data, to each of the at least one first SMA wire or the at least one second SMA wire.

9. The wearable electronic device of claim 8, wherein the logic is further configured to:
remove the current from each of the at least one first SMA wire and the at least one second SMA wire after a predetermined period of time.

10. A wearable electronic device, comprising:
logic, at least a portion of which is partially implemented in hardware, the logic configured to:
receive input data for one or more inputs registered by one or more input elements;
manipulate a shape memory material from a deformed shape to a default shape for each of one or more straps of the wearable electronic device, wherein each of the one or more straps is made of the shape memory material, which is a shape memory polymer, and wherein the manipulation causes a current to each of a heating device to displace heat throughout the shape memory polymer within each of the one or more straps; and
remove the current from the heating device configured to displace heat throughout the shape memory polymer within each of the one or more straps after a predetermined period of time.

11. The wearable electronic device of claim 10, wherein the logic is further configured to:
determine from the input data whether inputs are registered by certain segments of at least one input element; and
apply a current to a heating device for inputs to a particular segment of the at least one input element that are associated with the one or more straps that contains the heating device.

12. At least one computer readable storage medium comprising instructions that, when executed, by a processor, cause the processor to:
receive input data for on one or more inputs registered by one or more input elements; and
manipulate a shape memory material from a deformed shape back to a default shape for each of one or more straps of a wearable electronic device, wherein the shape memory material is a shape memory alloy (SMA) configured as at least one first SMA wire and at least one second SMA wire in each of the one or more straps, and wherein the manipulation causes a current to be separately applied, based at least on the input data, to each of the at least one first SMA wire and the at least one second SMA wire.

13. The medium of claim 12, wherein the manipulation causes the current to be removed from a heating device configured to displace heat throughout the shape memory polymer within each of the one or more straps after a predetermined period of time.

14. A method, comprising:
receiving input data for one or more inputs registered by one or more input elements; and
manipulating, based, at least in part, on the input data, a shape memory material from a deformed shape back to a default shape for each of one or more straps of a wearable electronic device, wherein the shape memory material is a shape memory alloy (SMA) configured within each of the one or more straps as at least one first SMA wire that has a first default shape that corresponds to a closed configuration for the wearable electronic device, and at least one second SMA wire that has a second default shape that corresponds to an opened configuration for the wearable electronic device, and wherein manipulating includes separately applying, based, at least in part on the input data, a current to each of the at least one first SMA wire or the at least one second SMA wire to open or close the one or more straps of the wearable electronic device.

15. A method, comprising:
receiving input data for one or more inputs registered by one or more input elements; and manipulating, based, at least in part, on the input data, a shape memory material from a deformed shape back to a default shape for each of one or more straps of a wearable electronic device, wherein the shape memory material is a shape memory polymer (SMP), wherein each of the one or more straps is made of the SMP, and wherein the manipulating includes applying a current to a heating device configured to displace heat throughout the shape memory material within each of the one or more straps.

* * * * *

UNITED STATES PATENT AND TRADEMARK OFFICE
CERTIFICATE OF CORRECTION

PATENT NO. : 10,061,350 B2
APPLICATION NO. : 14/142611
DATED : August 28, 2018
INVENTOR(S) : Aleksander Magi Page 1 of 1

It is certified that error appears in the above-identified patent and that said Letters Patent is hereby corrected as shown below:

On the Title Page

In Item (57), in Column 2, in "Abstract", Line 11, after "based" insert -- on --.

In the Claims

In Column 37, Line 11, in Claim 1, after "(SMA)" delete "is".

In Column 37, Line 22, in Claim 1, after "based" insert -- on --.

In Column 37, Line 30, in Claim 2, after "sensor" delete "configured".

In Column 37, Line 45, in Claim 3, after "based" insert -- on --.

In Column 38, Line 52, in Claim 10, after "current" insert -- to be applied --.

In Column 39, Line 4, in Claim 12, after "for" delete "on".

In Column 40, Line 10, in Claim 14, after "part" insert -- , --.

Signed and Sealed this
Second Day of April, 2019

Andrei Iancu
*Director of the United States Patent and Trademark Office*